United States Patent
Baird et al.

(10) Patent No.: US 8,990,292 B2
(45) Date of Patent: Mar. 24, 2015

(54) IN-NETWORK MIDDLEBOX COMPOSITOR FOR DISTRIBUTED VIRTUALIZED APPLICATIONS

(75) Inventors: Randall B. Baird, Austin, TX (US); Stephan E. Friedl, Frederick, CO (US); Thomas M. Wesselman, Issaquah, WA (US)

(73) Assignee: Cisco Technology, Inc., San Jose, CA (US)

( * ) Notice: Subject to any disclaimer, the term of this patent is extended or adjusted under 35 U.S.C. 154(b) by 334 days.

(21) Appl. No.: 13/176,086

(22) Filed: Jul. 5, 2011

(65) Prior Publication Data
US 2013/0013664 A1    Jan. 10, 2013

(51) Int. Cl.
G06F 15/16 (2006.01)
G06F 3/14 (2006.01)
H04L 29/08 (2006.01)
G09G 5/399 (2006.01)

(52) U.S. Cl.
CPC ............... *G06F 3/14* (2013.01); *H04L 67/025* (2013.01); *H04L 67/1002* (2013.01); *H04L 67/10* (2013.01); *G06F 3/1454* (2013.01); *G09G 5/399* (2013.01); *G09G 2340/0435* (2013.01); *G09G 2340/12* (2013.01); *G09G 2350/00* (2013.01); *G09G 2370/022* (2013.01); *G09G 2370/20* (2013.01)
USPC ............................. 709/203; 709/230; 709/231

(58) Field of Classification Search
CPC ................... H04L 29/06326; H04L 41/06503
USPC .......................................... 709/203, 230, 231
See application file for complete search history.

(56) References Cited

U.S. PATENT DOCUMENTS

| 6,226,642 | B1 | 5/2001 | Beranek et al. |
| 7,568,056 | B2 | 7/2009 | Danilak |
| 7,899,864 | B2 * | 3/2011 | Margulis ...................... 709/204 |
| 8,352,875 | B2 * | 1/2013 | Peltz et al. .................... 715/762 |
| 8,374,113 | B2 | 2/2013 | Meier et al. |
| 2003/0051070 | A1 | 3/2003 | Shappir et al. |
| 2006/0005187 | A1 * | 1/2006 | Neil ................................. 718/1 |
| 2006/0104259 | A1 | 5/2006 | Caballero-McCann et al. |
| 2006/0230105 | A1 | 10/2006 | Shappir et al. |

(Continued)

OTHER PUBLICATIONS

Cisco Data Sheet, "Cisco Unified Survivable Remote Site Telephone Version 4.1," 2008.

(Continued)

*Primary Examiner* — Thanh Tammy Nguyen
*Assistant Examiner* — Jonathan Bui
(74) *Attorney, Agent, or Firm* — Edell, Shapiro & Finnan, LLC

(57) ABSTRACT

Techniques are provided for using a middlebox to composite displays from multiple hosted virtualized applications (HVAs) for transmission to a client endpoint device. The middlebox receives one or more HVA displays via a virtual desktop interface (VDI) protocol, each HVA display from an individual HVA. The middlebox renders and composites the HVA displays together into a hosted virtual desktop (HVD) display, and sends the HVD display to the client endpoint device via a VDI protocol. The client endpoint device is therefore able to display a composite image of multiple HVA displays even if it is a zero client endpoint lacking the capability to perform compositing itself. In some examples, the middlebox reduces computational load by reducing the HVD frame rate, so that it is able to maintain HVD functionality during times of high system activity.

32 Claims, 15 Drawing Sheets

(56) References Cited

U.S. PATENT DOCUMENTS

| | | | |
|---|---|---|---|
| 2006/0230156 A1 | 10/2006 | Shappir et al. | |
| 2006/0230438 A1 | 10/2006 | Shappir et al. | |
| 2007/0018992 A1* | 1/2007 | Wong | 345/545 |
| 2007/0116246 A1 | 5/2007 | Walker et al. | |
| 2009/0021583 A1* | 1/2009 | Salgar et al. | 348/159 |
| 2010/0138744 A1* | 6/2010 | Kamay et al. | 715/716 |
| 2010/0146504 A1* | 6/2010 | Tang | 718/1 |
| 2011/0126110 A1* | 5/2011 | Vilke et al. | 715/736 |
| 2012/0054744 A1* | 3/2012 | Singh et al. | 718/1 |
| 2012/0084774 A1* | 4/2012 | Post et al. | 718/1 |
| 2012/0110131 A1* | 5/2012 | Villagas Nunez et al. | 709/219 |
| 2012/0226998 A1 | 9/2012 | Friedl et al. | |
| 2012/0246554 A1 | 9/2012 | Shappir | |
| 2012/0331127 A1* | 12/2012 | Wang et al. | 709/224 |
| 2013/0013664 A1 | 1/2013 | Baird et al. | |
| 2013/0024906 A9* | 1/2013 | Carney et al. | 725/135 |

OTHER PUBLICATIONS

HDX™ Technologies, hdx.citrix.com, 2 pages.

Wyse Thin Computing Software, Delivering the best experience over virtualized desktop environments, Summary Data, www.wyse.com, 9 pages.

Kerner, Sean Michael, "Riverbed Accelerates UDP with RiOS 7," Dec. 5, 2011, 1 page.

Interdigital, "Video-Aware Link Adaption," White Paper, www.interdigital.com, Oct. 2012, pp. 1-8.

Ericom, "Ericom Blaze, A Breakthrough in RDP Acceleration and Compression," http://www.ericom.com/specs/Ericom_Blaze.pdf, retrieved Oct. 2013, 2 pages.

Greenberg, et al., "Adaptive Offloading for Pervasive Computing," IEEE Pervasive Computing, vol. 3, No. 3, Jul.-Sep. 2004, pp. 66-73.

* cited by examiner

TIMELINE

IN-NETWORK MIDDLEBOX COMPOSITOR FOR DISTRIBUTED VIRTUALIZED APPLICATIONS

TECHNICAL FIELD

The present disclosure relates generally to virtualized applications and more particularly to providing in-network middlebox compositing for distributed virtualized applications.

BACKGROUND

The advantages of virtual machine technology have become widely recognized. Among these advantages is the ability to run multiple virtual machines or virtual applications on a single host platform, which makes better use of the capacity of the hardware while ensuring that each user enjoys the features of a "complete" computer. With the growing complexity of computer software and the growing reliance on software systems in everyday life and business, high performance in software execution has become expected by users. Performance of virtual machine software is particularly important because this software is often run on client systems that are memory and/or processor constrained, for example on wireless devices such as PDAs and smartphones or on thin clients or zero clients that tend to have less memory and processing power than a traditional computer system. The reduction of memory and/or processor usage by virtual clients remains a key goal for optimal performance.

DESCRIPTION OF EXAMPLE EMBODIMENTS

Overview

Techniques are provided for using a middlebox to composite displays from multiple hosted virtualized applications (HVAs) on host servers for transmission to a client endpoint device. The middlebox receives one or more HVA displays via a virtual desktop interface (VDI) protocol, each HVA display from an individual HVA. The middlebox renders and composites the HVA displays together into a hosted virtual desktop (HVD) display, and sends the HVD display to the client endpoint device via a VDI protocol. The client endpoint device is therefore able to display a composite image of multiple HVA displays even if it is a zero client endpoint lacking the capability to perform compositing itself. In some examples, the middlebox reduces computational load by reducing the HVD frame rate, so that it is able to maintain HVD functionality during times of high system activity.

Example Embodiments

Figure 1:
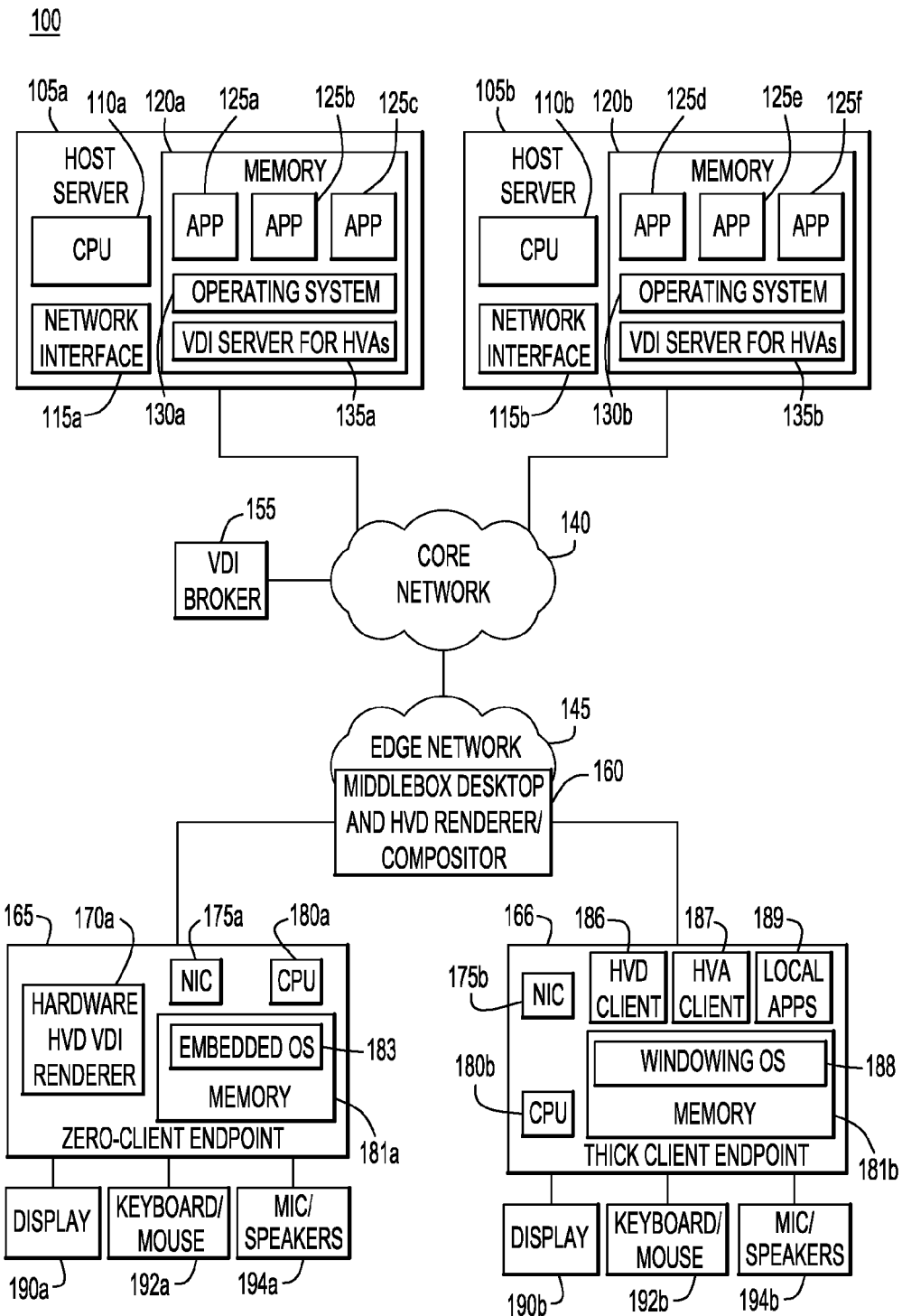
FIG. 1 is an example of a block diagram showing a virtual desktop interface (VDI) environment in which VDI connectivity can be established between client endpoint devices and one or more hosted virtualized application (HVA) hosts.

Referring now to the Figures, an example of a block diagram of a virtual desktop interface (VDI) environment in which VDI connectivity can be established between client endpoint devices and one or more hosted virtualized application (HVA) hosts is shown in FIG. 1. The depicted VDI environment 100 includes host servers 105a, 105b, client endpoint devices including zero-client endpoint 165 and thick client endpoint 166, a VDI broker 155, and a middlebox 160, which are interconnected via core network 140 and edge network 145. The VDI environment 100 may include additional servers, clients, and other devices not shown, and individual components of the system may occur either singly or in multiples, for example, there may be more than one middlebox 160, and other networking components, e.g., routers and switches, may be used in the VDI environment 100.

Host servers 105 each comprise one or more processors 110, a network interface unit 115, and memory 120. Each processor 110 is, for example, a data processing device such as a microprocessor, microcontroller, system on a chip (SOC), or other fixed or programmable logic, that executes instructions for process logic stored in memory 120. The network interface unit 115 enables communication throughout the VDI environment. Memory 120 may be implemented by any conventional or other memory or storage device, and may include any suitable storage capacity. For example, memory 120 may comprise read only memory (ROM), random access memory (RAM), erasable programmable read-only memory (EPROM), magnetic disk storage media devices, optical storage media devices, flash memory devices, electrical, optical, or other physical/tangible memory storage devices. The memory 120 may comprise one or more computer readable storage media (e.g., a memory device) encoded with software comprising computer executable instructions and when the software is executed (by processor 110) it is operable to perform the operations described herein. Resident in memory 120 of the host server 105 are one or more hosted virtual applications (HVAs) 125, host operating system (OS) 130, and a VDI server 135.

Each host server 105 may be, for example, a computing blade, a blade server comprising one or more solid state drives, or a blade center comprising one or more blade servers together with a blade chassis comprising common resources such as networking connections, input/output device connections, power connections, cooling devices, switches, etc. The host device 105 may be a component of a larger system, such as a Cisco Unified Computing System, or a data center that centralizes enterprise computing resources.

Core network 140 and edge network 145 each represent any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the VDI environment 100 may include any conventional or other communications devices to communicate over the networks via any conventional or other protocols, and may utilize any type of connection (e.g., wired, wireless, etc.) for access to the network.

Example client endpoint devices 165, 166 each comprise a network interface unit 175, one or more processors 180, and memory 181. The network interface unit 175 enables communication throughout the VDI environment. The processor 180 is, for example, a data processing device such as a microprocessor, microcontroller, system on a chip (SOC), or other fixed or programmable logic, that executes instructions for process logic stored in memory 181. Memory 181 may be implemented by any conventional or other memory or storage device, and may include any suitable storage capacity. For example, memory 181 may comprise ROM, RAM, EPROM, magnetic disk storage media devices, optical storage media devices, flash memory devices, electrical, optical, or other physical/tangible memory storage devices. The memory 181 may comprise one or more computer readable storage media (e.g., a memory device) encoded with software comprising computer executable instructions and when the software is executed (by processor 180) it is operable to perform the operations described herein.

The functions of the processors 110, 180 may each be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memories 120, 181 each store data used for the computations or functions described herein (and/or to store software or processor instructions that are executed to carry out the computations or functions described herein). Alternatively, one or more computer readable storage media are provided and encoded with software comprising computer executable instructions and when the software is executed are operable to perform the techniques described herein. Thus, functions of the process logic as described herein may be implemented with fixed logic or programmable logic (e.g., software or computer instructions executed by a processor or field programmable gate array (FPGA)).

The example client endpoint devices 165, 166 each interface with display device 190, input device(s) 192, and output device(s) 194, and communicates with these devices in any suitable fashion, e.g., via a wired or wireless connection. The display device 190 may be any suitable display, screen or monitor capable of displaying information to a user of a client endpoint device, for example the screen of a tablet or the monitor attached to a computer workstation. Input device(s) 192 may include any suitable input device, for example, a keyboard, mouse, trackpad, touch input tablet, touch screen, camera, microphone, remote control, speech synthesizer, or the like. Output device(s) 194 may include any suitable output device, for example, a speaker, headphone, sound output port, or the like. The display device 190, input device(s) 192 and output device(s) 194 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

The client endpoint devices may be any suitable computer system or device, such as a thin client, computer terminal or workstation, personal desktop computer, laptop or netbook, tablet, mobile phone, set-top box, networked television, or other device capable of acting as a client in the described VDI environment. Depicted herein are a zero-client endpoint 165 and a thick client endpoint 166, however a thin client or any other suitable computer system or device may also be used in the described VDI environment.

Example zero-client endpoint device 165 is a zero client (also called an "ultra-thin" client) that runs an embedded operating system 183 instead of a full operating system. The embedded operating system 183 is capable of rendering an HVD VDI session on its display 190*a*, receiving input from keyboard/mouse 192*a* and managing sound input/output with microphone/speakers 194*a*. Zero-client 165 may also have a CPU 180*a* with a low duty cycle (executing only a relatively small number of instructions per second), and a small memory 181*a*, with little buffer space. The example zero-client 165 also comprises a hardware-based HVD VDI renderer 170*a* (which may be, e.g., a Teradici or Microsoft Calista-based chipset). HVD VDI session data is received directly from network interface controller 175*a* and relayed to the hardware-based HVD VDI renderer 170*a*. Zero client endpoint 165 therefore has a lower cost, lower power consumption, and very little configuration required for installation into the network 140, 145, as compared to a thin client, laptop computer, or other typical VDI client device.

Example thick client endpoint device 166 is a thick or "fat" client which, because it runs HVD and/or HVA rendering in software, should have a CPU 180*b* with a higher duty cycle, and a larger memory 181*b* to accommodate HVD and/or HVA client software 186, 187, along with the buffers needed to receive a VDI stream. If direct receipt of HVA VDI sessions is desired, e.g., directly from a host server 105 in the event of a middlebox failure or the absence of a middlebox, then thick client 166 should comprise a windowing OS 188 capable of compositing the multiple HVA windows. Thick client endpoint 166 is a more flexible device than zero client 165 because it is capable of running local applications 189, but the flexibility comes at the expense of higher CPU and memory costs, greater power consumption, and increased installation and management expense for the more complex system.

Users of endpoint devices 165, 166 log in to VDI broker 155 to identify and authenticate themselves and request an HVD VDI session with the network. Broker 155 may be aware of the configuration (e.g., distribution) of middleboxes 160 throughout the networks 140, 145, and may be aware of the current computational load of the middleboxes 160. Broker 155 uses configuration and load information to assign a middlebox 160 to handle a particular HVD session for endpoint device 165, 166. For example, in some embodiments, the broker 155 may preferentially assign a middlebox that is in the same edge network 145 as endpoint device 165, 166, or that is otherwise topologically close to the endpoint device 165, 166 with a high bandwidth network path between the endpoint device 165, 166 and the middlebox 160. Also, for example, in some embodiments, the broker 155 may preferentially assign a middlebox that is lightly loaded with other HVD and HVA sessions, thereby balancing the HVD and HVA load across multiple middleboxes in the network as much as possible. The middlebox 160, which is a network device (with suitable processing capability) located between host servers 105 and client endpoint devices 165, 166 operates to combine HVA displays from the HVAs 125a-f on host servers 105a, 105b with a desktop in order to produce a hosted virtual desktop (HVD) display for rendering on the client endpoint devices 165, 166.

Figure 2:
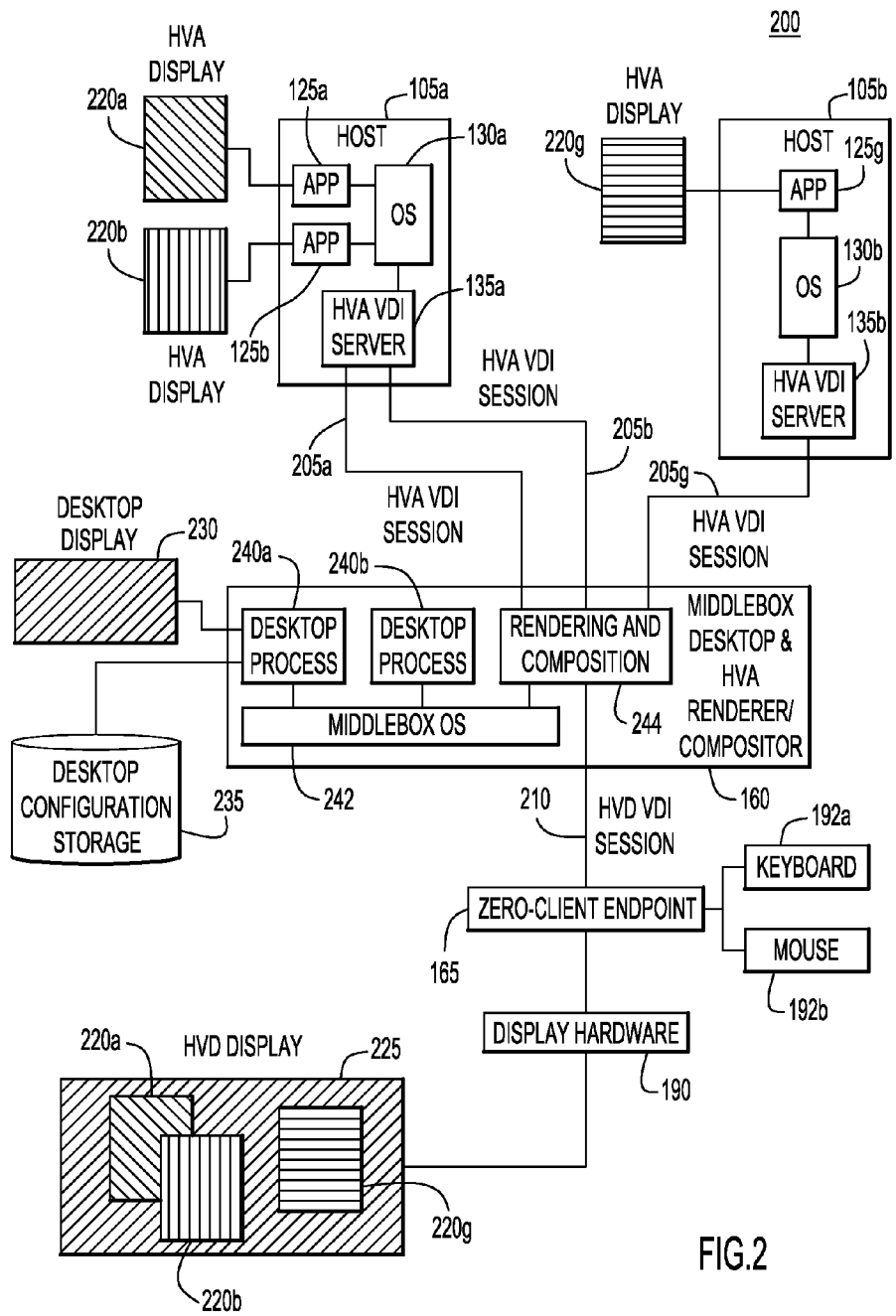
FIG. 2 is an example of a block diagram showing a logical view of HVA display data that is input to a middlebox from multiple HVAs, and a hosted virtual desktop (HVD) display that is output from the middlebox to a client endpoint device, in the VDI environment.

FIG. 2 depicts an example of a logical view 200 of HVA display data that is input to a middlebox from multiple HVAs, and a hosted virtual desktop (HVD) display that is output from the middlebox to a client endpoint device, in the VDI environment. In particular, FIG. 2 depicts how HVA displays 220a, 220b, 220g are transported from the host servers 105 to the middlebox 160, where they are composited with a desktop display 230 to provide an HVD display 225 that is transported to zero-client endpoint 165 for display on display hardware 190. The middlebox 160 receives HVA data from each HVA 125 via an HVA VDI session 205 between the middlebox 160 and the HVA VDI server 135, and communicates the HVD display to the appropriate endpoint device 165, 166 via one or more HVD VDI sessions 210. The VDI sessions 205, 210 are VDI protocol links that are established using any suitable VDI protocol, for example Citrix Independent Computing Architecture (ICA), VMWare PC over IP (PCoIP), Microsoft Remote Desktop Protocol (RDP), or other suitable protocol.

Host 105a runs HVAs 125a and 125b, and host 105b runs HVA 125g. On host 105a, HVA 125a uses operating system 130a to output graphics command data for HVA display 220a, and HVA 125b operating system 130a to output graphics command data for HVA display 220b, and on host 105b, HVA 125g uses operating system 130b to output graphics command data for HVA display 220g. On each host 105, the graphics commands are intercepted by the HVA VDI server 135, which encodes them and transports them to middlebox 160 over HVA VDI session 205. The data for each HVA 125 is transported over a separate HVA VDI session 205, e.g., HVA VDI server 135a transports the data for HVA 125a over HVA VDI session 205a and the data for HVA 125b over HVA VDI session 205b, and HVA VDI server 135b transports the data for HVA 125g over HVA VDI session 205g.

It is understood that the depicted configuration of HVAs 125 on hosts 105, and the types of HVAs, is only an example, and that any configuration of HVAs on hosts, and on any number of hosts, may be produced. Furthermore, multiple instantiations of the same HVA (e.g., a web browser or word processing software) may run on the same or different hosts, so that multiple sessions may be produced, one for each endpoint device invoking the HVA. The number and configuration of HVA and HVD sessions may also vary, for example although the depicted example shows each instance of an HVA 125 as associated with a separate HVA VDI session 205, in other example embodiments, two or more HVA VDI sessions from the same host device may be multiplexed into a single VDI session. Similarly, multiple HVD VDI sessions 210 may be connected to the same client endpoint. It is also understood that the representation of a graphical user interface (GUI) for an HVA display 220 is a logical representation; no rendering of the graphics commands to an actual display takes place on the hosts 105. Instead, graphics commands are encoded as data to be transported on HVA VDI sessions 205, using a suitable VDI protocol.

A user of zero-client endpoint 165 logs in with broker VDI 155 (shown in FIG. 1), which refers the endpoint to establish an HVD VDI session 210 with the middlebox 160. Upon establishment of the HVD VDI session 210, middlebox 160 instantiates a desktop process 240a, which provides an environment in which to represent the HVA displays 220 for the HVAs 125 that the user of the endpoint 165 wishes to use. It will be understood that desktop process 240b may service a different HVD session to a different endpoint. Desktop processes 240 may perform one or more services including starting and stopping HVAs, managing file systems, providing inter-application facilities like cut and paste, controlling the placement, size, and ornamentation of HVA display windows, and otherwise providing the services common to a desktop manager of a modern desktop operating system. Desktop processes 240 may provide a configuration that is specific to the particular user of the HVD session, for example, a particular desktop background image, placement of icons on the desktop, customized controls for the desktop, a pre-launched set of applications, etc. In one example embodiment, desktop processes 240 only position and size the HVA displays 220 on an otherwise empty display, and do not perform other services such as managing file systems.

User-specific configuration information may be fetched from desktop configuration storage area 235, which may be resident on the middlebox 160 or accessible as a network service to a group of middleboxes 160 and hosts 105. Storage area 235 may be a database, and may be implemented by any conventional or other memory or storage device, and may include any suitable storage capacity. For example, storage area 235 may comprise ROM, RAM, EPROM, magnetic disk storage media devices, optical storage media devices, flash memory devices, electrical, optical, or other physical/tangible memory storage devices.

Desktop processes 240 use the desktop configuration information stored in storage area 235 to generate a desktop display 230, utilizing middlebox operating system 242 to generate graphics commands, which are in turn forwarded to a rendering and composition system 244. The desktop processes 240 may use a desktop management system that is built specifically for middlebox 160, or it may use an off-the-shelf desktop management system that is compatible with the middlebox OS 242. For example, if the middlebox OS 242 is a Linux-based operating system, a desktop management system such as the GNU Network Object Management Environment (GNOME), the K Desktop Environment (KDE), the Common Desktop Environment (CDE), or other suitable system, may be used.

In another example embodiment, middlebox 160 may host a hypervisor and allow multiple virtual operating systems, each with it own desktop manager, to be present. This embodiment allows the use of desktop environments that have been designed for desktop computing devices, for example, Microsoft Windows. In such a middlebox environment, the rendering and composition system 244 may act as a virtual graphics engine for the virtualized desktops and operating systems.

The various operating systems mentioned with reference to FIGS. 1 through 2, such as the host operating system 130, the client operating system 183, 188, and the middlebox operating system 242, may be any suitable operating system for use in the VDI environment 100, such as, for example, a FreeBSD, Linux, OS X, UNIX, Windows, or other operating system. The operating system may be a standard operating system, an embedded operating system, or a real-time operating system. For example, the host OS 130 and/or the middlebox OS 242 may be a Linux operating system such as Ubuntu or Red Hat Enterprise Linux, a Mac operating system such as OS X or OS X Server, or a Windows operating system such as Windows 7 or Windows Server 2008 R2. The client operating system 183, 188 may be, for example, a Blackberry, Linux, OS X, Windows, or other operating system. In one embodiment, one or more of the operating systems is a flavor of Linux, such as Android, MeeGo, ThinStation, Ubuntu, webOS, or the like. In another embodiment, one or more of the operating systems is an Apple operating system, such as OS X, iOS, or the like, or a Windows operating system, such as Windows 7, Windows CE, Windows Vista, Windows XP, or Windows XPe.

Rendering and composition system 244 on the middlebox 160 receives graphics input from desktop processes 240 and from HVA sessions 205, renders the input, and then composites the rendered data to produce a full HVD display 225. When compositing these data, rendering and composition system 244 uses information provided by the desktop processes 240 or a window manager in the middlebox OS 242 to determine window size, position, and z-order. Z-order, that is, the order in which the windows comprising the HVD display 225 are rendered on top of one another, describes the relative depth of the various windows. For example, windows with the deepest (lowest) z-order are drawn first, and each window with a successively shallower (higher) z-order is drawn subsequently, which may result in the deeper windows being partially or fully occluded on the display. The assignment of higher-valued integers to shallower windows is somewhat arbitrary, but higher z-order shall herein be understood to imply shallower windows, i.e., windows stacked closer to the user's eyes, and lower z-order shall herein be understood to imply deeper in the window stack.

Once the HVD display 225 is fully composited, rendering and composition system 244 encodes the HVD display 225. As with the hosts 105, it is understood that the representation of a graphical user interface (GUI) for an HVD display 225 is a logical representation; no rendering of the graphics commands to an actual physical hardware display takes place on the middlebox 160. Instead, graphics commands may be kept in an unrendered form throughout the rendering and composition process, and then encoded as data to be transported on HVD VDI session 210, using a suitable VDI protocol. The HVD VDI data is then sent over HVD VDI session 210 to zero-client endpoint 165, or thick client endpoint 166 (not shown here), which in turn renders the HVD display 225 on display hardware 190.

When user input is received, for example, the user strikes keys on keyboard/mouse 192a or manipulates mouse on keyboard/mouse 192a, the endpoint 165 sends messages to the middlebox 160 via HVD VDI session 210. Middlebox 160 consults middlebox OS 242 and/or desktop process 240 to determine the focus of the input events, that is, whether the events apply directly to the desktop process 240 itself, or to a particular HVA 125. If the input focus is one of the HVAs (e.g., HVA 125b), then the input event is translated and sent to that HVA on the HVA VDI session 205 for that HVA (e.g., HVA VDI session 205b). The VDI server 135 associated with the HVA 125 in focus receives the translated user input, translates it into virtual keyboard and mouse inputs, and feeds it via host operating system 130 to the HVA 125, which processes the user inputs and may accordingly send an updated HVA display 220 back to the middlebox 160 for transmission to the endpoint 165. If the input focus is the desktop itself, then the input is forwarded to the desktop process 240, which processes the input accordingly and may modify the desktop display 230b.

The example embodiments provide a number of benefits including increased performance and decreased costs, as compared to conventional HVD or HVA systems. For example, host servers running HVDs utilize indeterminate and fluctuating amounts of bandwidth, dependent on the applications being currently run on the HVD. Particularly when HVD hosts are placed in a data center, HVD VDI session bandwidth places an indeterminate and often large load on core network 140. Also, if HVD hosts or HVAs communicate directly with the endpoint devices 165, 166, then the endpoint devices would need to be more complex, e.g., zero-client endpoint devices 165 could not be used, because they are not capable of rendering and compositing multiple HVA displays or HVD displays.

The example embodiments eliminate this need for complex and expensive thin/thick endpoint devices, by running HVA VDI sessions 205 from the host servers 105 to the middlebox 160, having the middlebox 160 render and composite the HVA data, and then transmitting a composited HVD display to the endpoint devices 165, 166 via HVD sessions 210. The example embodiments provide a number of advantages in addition to enabling the use of lower-cost zero client endpoints. For example, because each HVA is a single application, the individual HVA VDI sessions of the example embodiments generally require a well-defined amount of bandwidth, and allow for improved bandwidth management in the overall network. For example, if a particular type of HVA (e.g., an HVA displaying video) consumes a large amount of bandwidth, the demand for this HVA as opposed to other applications on the host server may be determined, and the HVA may then be deployed close to the edge networks 145 with middleboxes 160 that exhibit the highest demand for it in order to improve performance. Although the HVD stream 210 between the middlebox 160 and the client endpoints 165, 166 may be very high bandwidth, the co-location of the middlebox 160 on the same edge network 145 as the client endpoints it servers makes high bandwidth consumption less problematic because the edge network may utilize LAN technology for its datalink. Also, HVAs tend to be easier to install, configure, and manage, because each HVA application stands alone and does not need to be configured in conjunction with a desktop.

Figure 3:
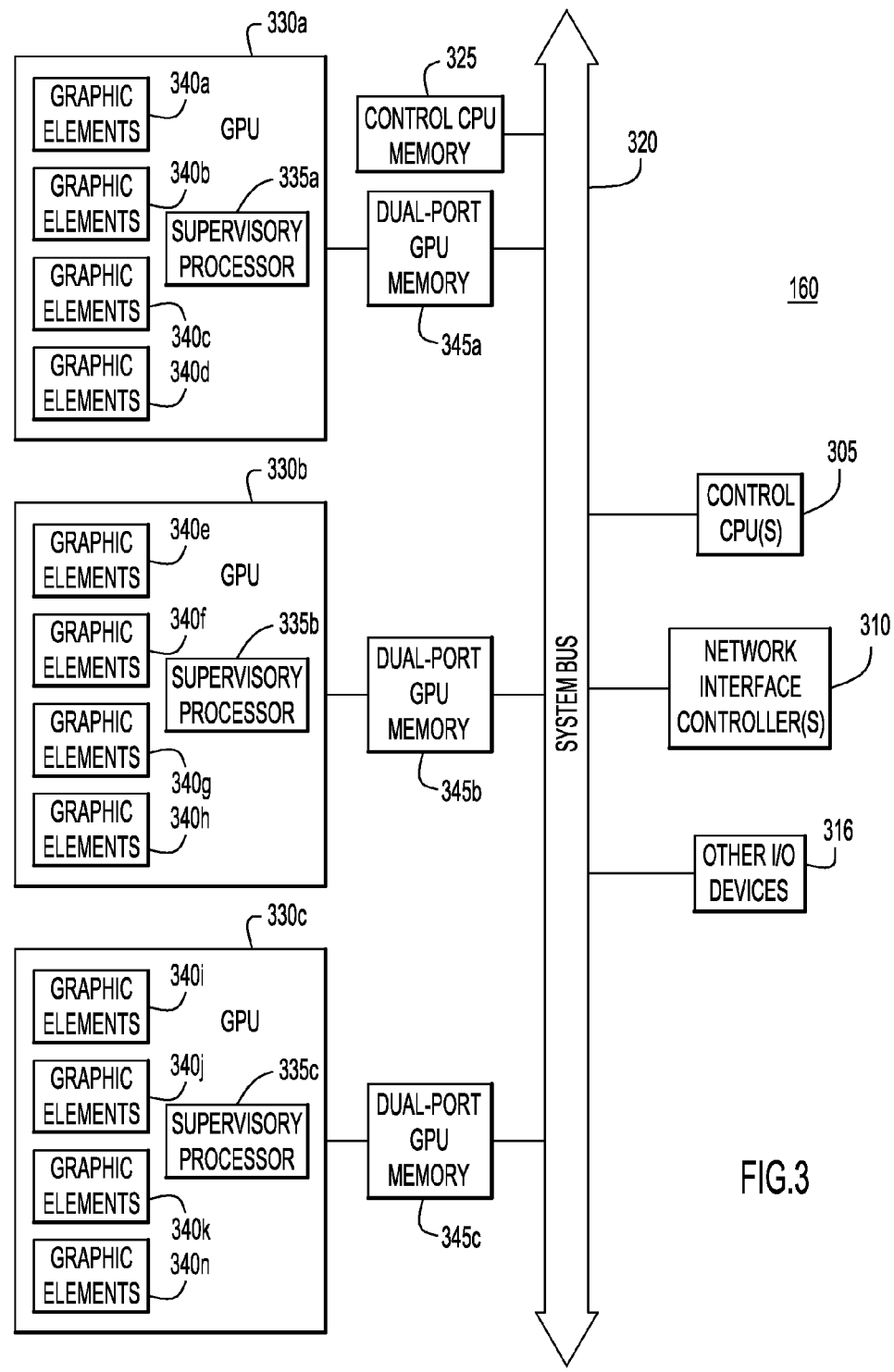
FIG. 3 is an example of a block diagram showing an example middlebox that may be used in the VDI environment.

FIG. 3 depicts the structure of an example middlebox 160 device that may be used in the VDI environment 100 described herein. The middlebox 160 comprises one or more control processors (e.g., a CPU) 305, one or more network interface controllers (NICs) 310, other input/output (I/O) devices 316 such as, e.g., hard disk interfaces, flash memory interfaces, or universal serial bus (USB) interfaces, dedicated control CPU memory 325, and one or more dual-port graphics processing unit (GPU) memories 345a, 345b, 345c, all interconnected via system bus 320. Each dual-port memory 345 is in turn attached to a GPU 330, which may be, for example, a custom GPU built for use in middlebox 160, or an off-the-shelf GPU such as, for example, a GPU made by ATI Technologies, Nvidia, Matrox, S3Graphics, or VIA Technologies.

Each processor 305, 330 is, for example, a data processing device such as a microprocessor, microcontroller, system on a chip (SOC), or other fixed or programmable logic, that executes instructions for process logic stored in respective memory 325, 345. The NIC 310 enables communication throughout the VDI environment. Memory 325, 345 may be implemented by any conventional or other memory or storage device, and may include any suitable storage capacity. For example, memory 325, 345 may comprise ROM, RAM, EPROM, magnetic disk storage media devices, optical storage media devices, flash memory devices, electrical, optical, or other physical/tangible memory storage devices. The memory 325, 345 may comprise one or more computer readable storage media (e.g., a memory device) encoded with software comprising computer executable instructions and when the software is executed (by respective processor 305, 330) it is operable to perform the operations described herein.

The functions of the processors 305, 330 may each be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the associated memories 325, 345 each store data used for the computations or functions described herein (and/or to store software or processor instructions that are executed to carry out the computations or functions described herein). Alternatively, one or more computer readable storage media are provided and encoded with software comprising computer executable instructions and when the software is executed operable to performing the techniques described herein. Thus, functions of the process logic as described with reference to FIGS. 7 through 11, for example, may be implemented with fixed logic or programmable logic (e.g., software or computer instructions executed by a processor or field programmable gate array (FPGA)).

As shown in FIG. 3, each GPU 330 may comprise one or more supervisory processors 335 and an array of graphics elements 340. Although each of the depicted GPUs 330a, 330b, 330c is shown as having only four graphics elements (e.g., elements 340a-d for GPU 330a), it is understood that each GPU 330 may have many more graphics elements 340 than four, for example dozens, hundreds or thousands of graphics elements. Similarly, although only three GPUs 330a, 330b, 330c are depicted here, it is understood that each middlebox 160 may have many more GPUs 330, for example dozens or hundreds of GPUs. However, each GPU 330 may be associated with its own dual-port GPU memory 345 for optimum processing. Typically, each graphics element 340 runs its own instruction pipeline from an instruction cache on the graphics element itself, and has access to dual-port GPU memory 345. Graphics elements 340 therefore represent a massively parallel array of elements that can simultaneously decode, render, composite, and encode data from desktop processes 240, middlebox OS 242, and HVA sessions 205.

Although FIG. 3 depicts the graphics memories 345 as dual-port memory, it is understood that the depicted and described examples are only one possible example implementation of the present embodiments, and that dual-port memory is not required to be used. For example, any memory that is capable of allowing multiple read/write accesses by the GPU 330 and the system bus 320 in a short period of time to allow for high-volume graphics processing may be used. In various example embodiments, the graphics memories 345 may be single-port memories, dual-port memories, pseudo dual-port memories, multi-port memories, pseudo multi-port memories, or any combination thereof.

Figure 4:
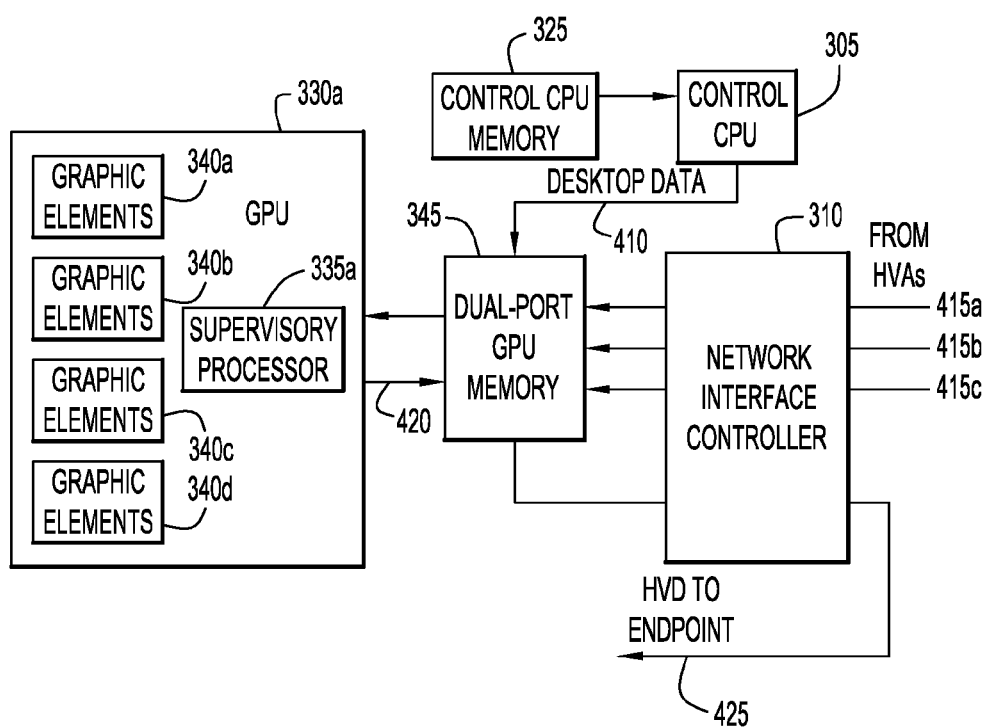
FIG. 4 is an example of the data flow between and among the various components of the middlebox for a typical endpoint session between the middlebox and a client endpoint device in the VDI environment.

FIG. 4 is an example of the main data flow between and among the various components of the middlebox 160 for a typical endpoint session between the middlebox 160 and a client endpoint device (e.g., device 165 in FIG. 1), and between middlebox 160 and devices hosting HVAs (e.g. host servers 105 in FIG. 1). Desktop graphics data and commands 410 are manipulated and transferred by CPU 305 from control CPU memory 325 to a dual-port GPU memory 345. HVA session data 415a-c is received from network 140, 145 by NIC 310 and transferred directly to buffers in the dual-port GPU memory 345. The dual-port GPU memory 345 sends the graphics data 420 to the graphics elements 340 for decoding, rendering, composition, and encoding of the data. The graphics elements 340 require high-bandwidth access to dual-port GPU memory 345 as they read, modify, and write data to accomplish their tasks. The decoded, rendered, composited and encoded graphics data in HVD format 425 is then transferred by NIC 310 from dual-port GPU memory 345a through networks 140, 145 to the client endpoint device.

It will be appreciated that the data manipulation and transfer requirements on the control CPU 305 are fairly modest, in that the control CPU 305 does not participate in the actual encoding, rendering, composition, and encoding of desktop, HVA, or HVD data. Similarly, the bandwidth requirements of system bus 320 are no larger than those of any other network middlebox such as, for example a router, switch, network firewall, etc. However, in the example embodiments the memory bandwidth consumed by the GPU 330 as it accesses dual-port GPU memory 345 is very large, and necessitates a dual-port GPU memory design that can handle the simultaneous bandwidth demands of the CPU 305, NIC 310, and GPU 330.

Figure 5:
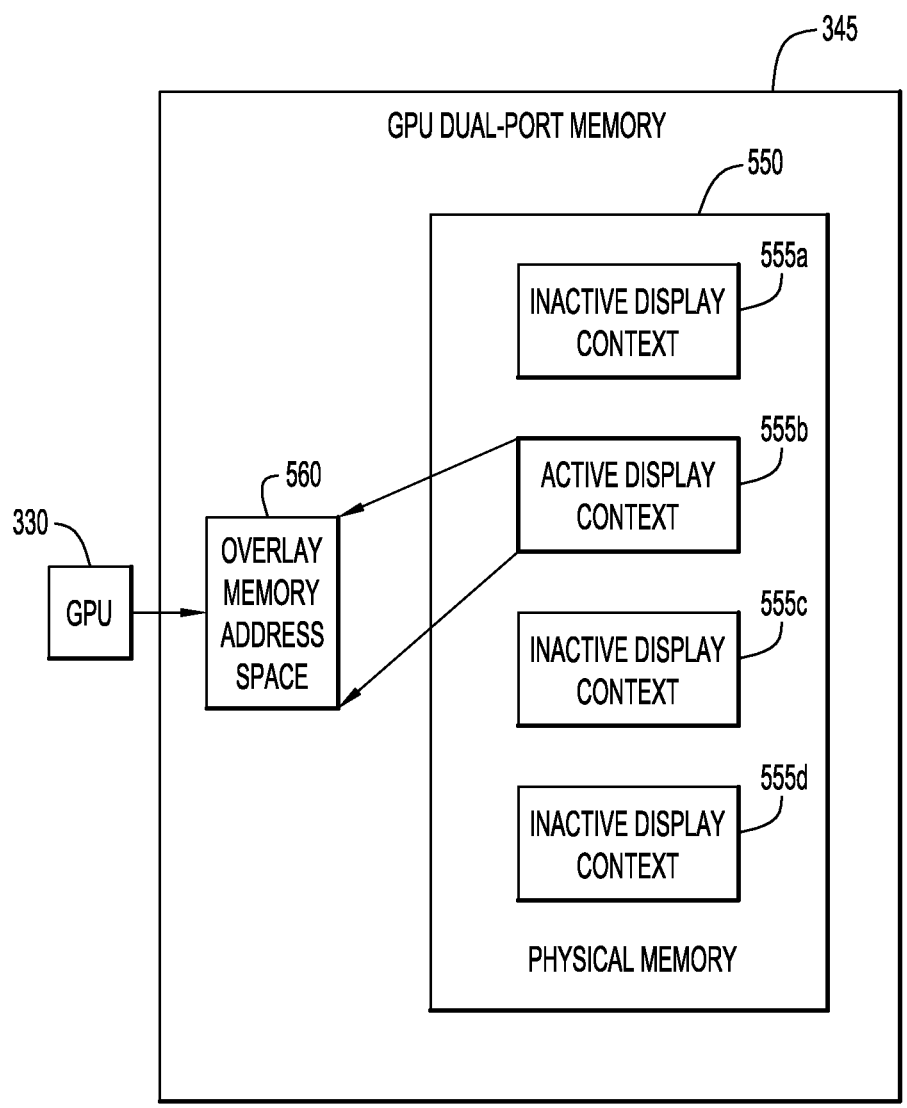
FIG. 5 is an example of a block diagram showing an example organization of a Graphics Processing Unit (GPU) dual-port memory component of the middlebox.

FIG. 5 is an example of a block diagram showing an example organization of a GPU dual-port memory 345 component of the middlebox. As depicted, the GPU dual-port memory 345 comprises physical memory 550 and may also comprise an overlay memory address space 560, which GPU 330 uses during its execution. The physical memory 550 comprises zero or more display contexts (DCs) 555a-d, each of which contains the complete state of the current rendering of the HVD for a single endpoint device. Because each GPU 330 in the middlebox 160 supports multiple endpoints (each endpoint supported by a display context), a VDI environment utilizing the middlebox 160 in conjunction with zero clients 165 is less costly than that of a traditional HVD system requiring thick clients capable of compositing HVAs directly on the endpoints.

As is explained in more detail with reference to FIGS. 9 through 11, the GPU 330 executes a method to save the current DC state 555b, load a new DC state 555c, and begin executing the new DC 555c, so that a different HVD is being rendered at different times. It will be understood that the switching between DCs on a single GPU may be similar to switching between tasks or time-sharing on a CPU, or, in another example embodiment, may be similar to a CPU that is capable of switching between virtual machines. In an example embodiment, the GPU comprises built-in hardware support for context switching between display contexts. Associated with each DC 555 is an area of dual-port memory 345, containing the input and output buffers and working memory for the task of decoding and rendering input VDI streams 205 for HVAs, compositing those rendered HVA windows 220 into an HVD display 225, and encoding the HVD display 225 into an HVD VDI stream 210.

Some GPUs are constructed to render a single desktop image, and thus the ability to switch between DCs may require new capabilities from the GPU 330. For example, because the GPU 330 comprises a large number of graphics elements 340, the GPU address space over which the graphics elements 340 may execute may be too small to accommodate addressing a large number of DCs 555. In other words, the GPU memory 345 may comprise a physical memory 550 that is larger than the GPU address space. In such example embodiments, the GPU memory 345 comprises an overlay memory address space 560 into which the portion of physical memory 550 associated with an active DC 555b is mapped, in order to make it accessible by the GPU 330 as it executes the processes associated with active DC 555b. In another embodiment, the address space supported by GPU 330 is large enough to directly address the entire physical memory 550 and overlay memory address space 560 is unnecessary.

Figure 6:
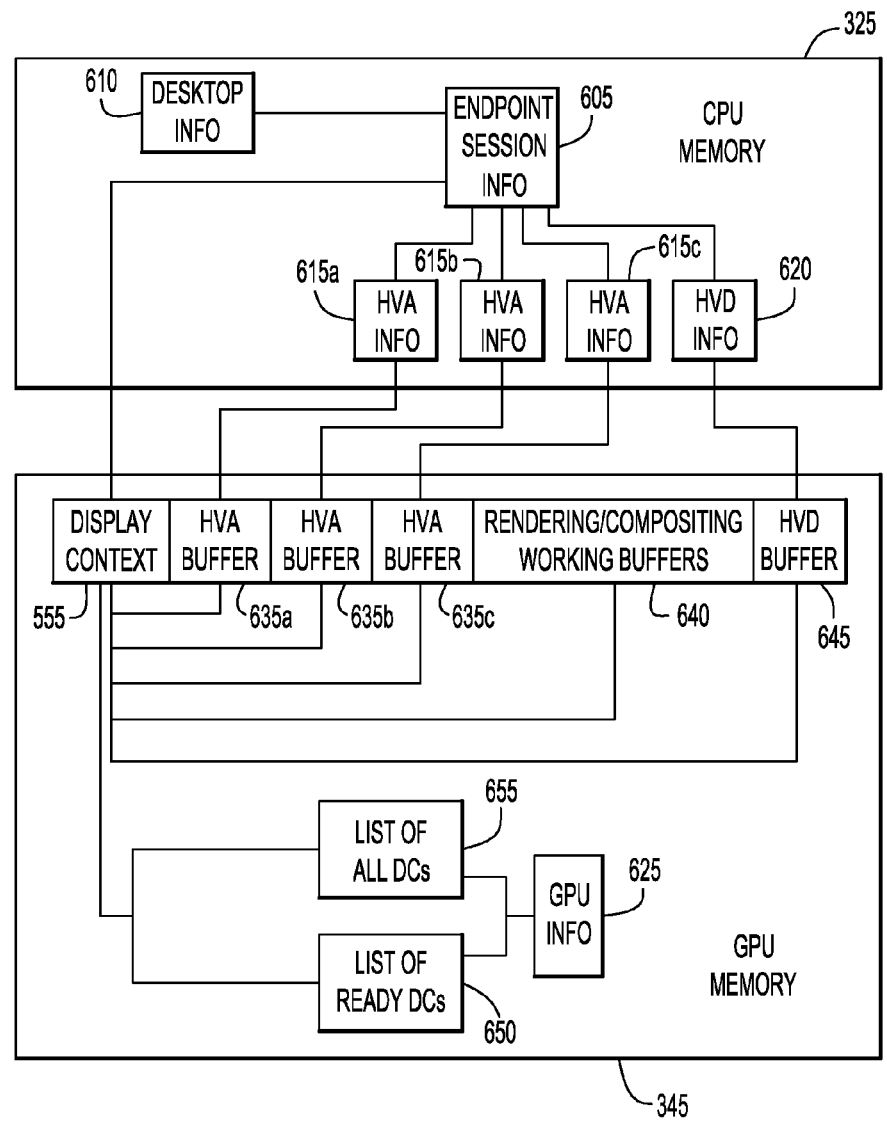
FIG. 6 is an example of a block diagram showing an example of data structures in the GPU and Central Processing Unit (CPU) memory for a typical endpoint session between the middlebox and a client endpoint device in the VDI environment.

FIG. 6 is an example of a block diagram showing an example of data structures in the GPU and Central Processing Unit (CPU) memory for a single endpoint session 210 between the middlebox 160 and a client endpoint device 165. It is understood that although FIG. 6 depicts certain data structures as residing in CPU control memory 325, and other data structures as residing in GPU memory 345, other partitionings of the data structures between the CPU control memory 325 and the GPU memory 345 are possible. Similarly, although FIG. 6 depicts certain types of data structures, it is understood that the data structures may be organized in a substantially different manner. Also, although only one endpoint session information block 605 and display context 555 are shown with their related data structures, it is understood that multiple sets of endpoint session information blocks 605 and display contexts 555 along with their related data structures are in fact present in any given implementation, one set for each endpoint session 210 active on the middlebox 160.

In the depicted example, CPU memory 325 comprises zero or more endpoint session information blocks 605, desktop information block 610, HVA session information blocks 615a-c, and HVD session information block 620, and GPU memory 345 comprises zero or more display contexts (DC) 555, GPU information block 625, HVA buffers 635a-c, working buffers 640 (as needed), HVD buffer 645, a list 655 of all DCs present in GPU memory 345, and a list 650 of all ready DCs.

Each endpoint session information block 605 manages all aspects of a particular HVD session 210, i.e., it controls the execution of all tasks on the GPU associated with the HVD session 210. The endpoint session information block 605 comprises a reference to desktop information block 610, HVA session information blocks 615a-c, HVD session information block 620, and display context 555 resident in GPU memory 345. The desktop information block 610 manages the configuration and operation of the desktop application 240 used to render the desktop of HVD display 225. HVA session information blocks 615a-c control data received and sent over HVA VDI sessions 205a-c, and refer to their associated HVA buffers 635a-c in GPU memory 345, which are used to receive data from HVA sessions 205a-c. HVD session information block 620 controls the data sent and received over HVD VDI session 210, and refers to HVD buffer 645, which is used to accumulate rendered, composited, and encoded data to be sent on HVD session 210.

Each display context (DC) 555 contains all state necessary for the GPU 330 to execute all tasks associated with decoding, rendering, and compositing HVA and desktop information, and encoding that information into HVD session data. The DC 555 therefore comprises references to all HVA buffers 635a-c and HVD buffer 645, as well as additional working buffers 640 that may be needed. DC 555 also comprises metrics to manage, when necessary, GPU congestion or overload conditions, which are described with reference to FIGS. 8 through 11. GPU information block 625 comprises all global information necessary to manage the operation of GPU 330, and in particular manages the list 655 of all DCs 630 present in GPU memory 345, and the ready list 650 of all DCs 630 that are "ready", i.e. that have HVA data present in their buffers 635a-c that have not yet been processed. GPU information block 625 also may comprise metrics to manage, when necessary, GPU congestion or overload conditions, which are described with reference to FIGS. 8 through 11. In another embodiment, said metrics may also reside in a separate CPU memory structure.

Figure 7:
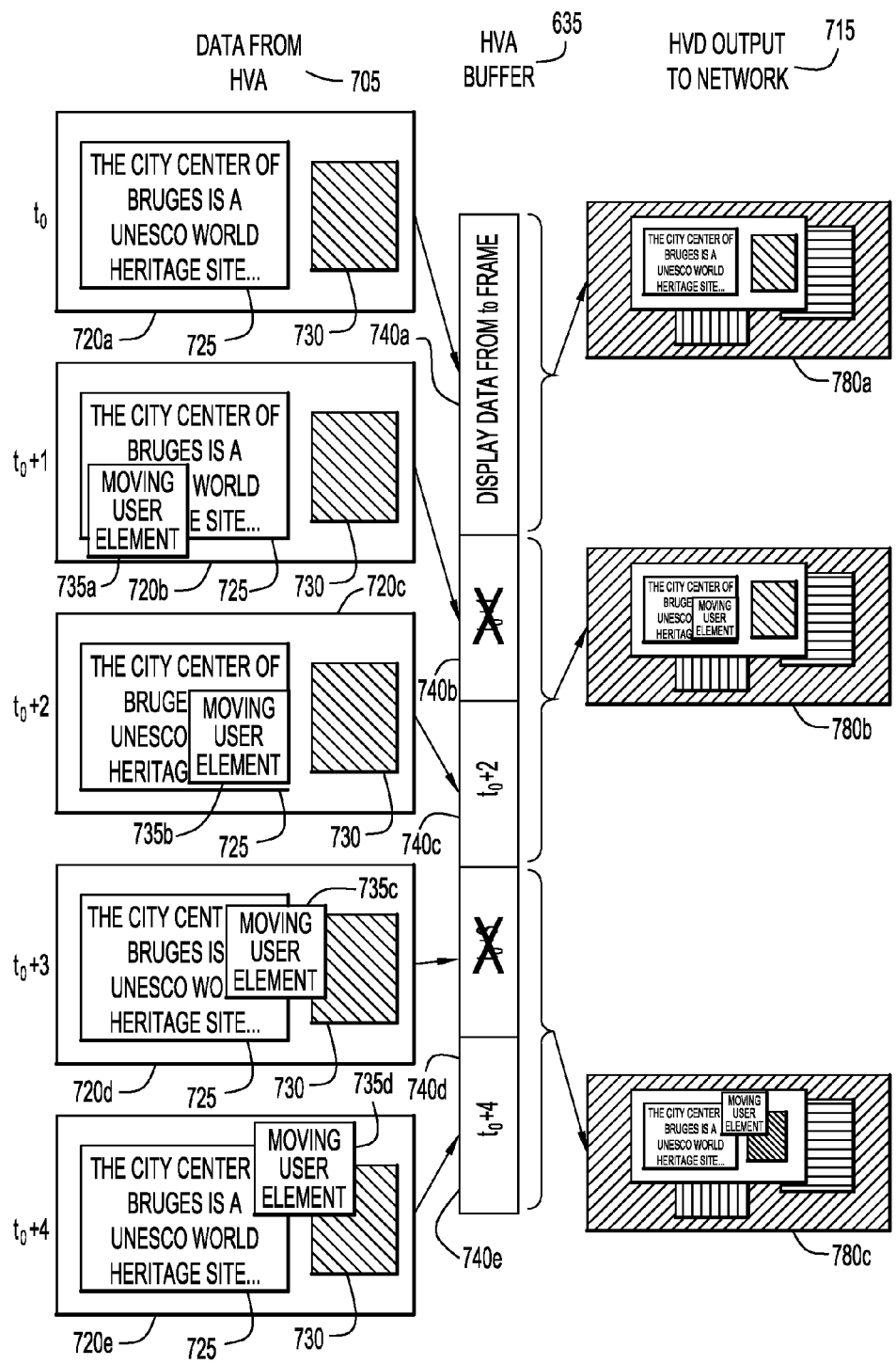
FIG. 7 is an example of a diagram illustrating how the frame rate of HVA display data may be reduced in order to reduce computational load at the middlebox.

FIG. 7 is an example of a diagram illustrating how the frame rate of HVA display data may be reduced or "throttled" in order to reduce computational load at the middlebox. Because a single GPU 330 services a large number of display contexts (each associated with an endpoint device), the possibility exists that a burst of system activity, for example, a large group of endpoint users deciding to watch a live video of an ongoing meeting, may overload the computing capacity of an individual GPU 330. In order to prevent disparate allocation of limited HVD service resources and resultant disparities in service to multiple endpoints, the GPU 330 performs a method to reduce the compute load on each display context during periods of high system activity so that the HVD service to all endpoints 165 is maintained, albeit gracefully degraded. An example of such a method is to consolidate several incoming HVA frames into a single outgoing HVD frame.

As used herein, a "frame" refers to a unit of HVA or HVD data that, when received, can be used to render a change to an HVA or HVD display, or an HVA or HVD display in its entirety. The frame may be an "I-frame-like" standalone frame in that it contains all of the information needed for a particular HVA or HVD display at a particular point in time (similar to a video I-frame), or it may be a "P-frame-like" difference frame in that it contains only some information needed for a particular HVA or HVD display at a particular point in time and thus is used in conjunction with a prior (similar to a video P-frame).

As used herein, the "frame rate" is the frequency (rate) number of HVA or HVD frames that are generated, transmitted, or otherwise processed in a given period of time, and is usually referred to in units of frames per second (fps). Accordingly, an incoming HVA stream or outgoing HVD stream may be considered to have a frame rate. For example the middlebox 160 may receive an incoming HVA stream of 15 frames in one second, and thus this set of received HVA frames has a frame rate of 15 fps, or the middlebox 160 may send an outgoing HVD stream of 4 frames in one second, and thus this set of HVD frames has a frame rate of 4 fps. It will be understood that many HVAs and HVDs may have sets of frames with variable or bursty frame rates; for example, an office productivity HVA may sit idle and open for hours or even days at a time with a set of zero frames sent during that period, then send a set of frames with a frame rate of 10-20 fps as soon as the user begins scrolling through data, only to return to the idle state with a set of zero frames sent once the user stops interacting with the HVA.

FIG. 7 illustrates an example method of reducing computing load. In FIG. 7, an incoming stream of data 705 from an HVA comprises a series of frames 720a-e of an HVA application window. In the example, each frame 720 is received at a regular time interval, starting at time $t_0$, however, it will be understood that frames 720 may also be received at irregular intervals. In each frame 720, the application window comprises unchanging user elements 725 and 730, and may also comprise a moving user element 735a-d that moves across the unchanging elements 725, 730. In the depicted example, the VDI protocol used to receive HVA data stream 705 encodes each HVA frame 720 as a standalone frame, i.e. the encoding of each frame does not rely on the encoding of the frames before it and so is I-frame-like.

Data from each HVA frame 720a-e is received into a respective frame buffer 740a-e in HVA buffer 635 on middlebox 160. For example, HVA frame 720a received at time $t_o$ is received into frame buffer 740a, HVA frame 720b received at time $t_0+1$ is received into frame buffer 740b, HVA frame 720c received at time $t_0+2$ is received into frame buffer 740c, HVA frame 720d received at time $t_0+3$ is received into frame buffer 740d, and HVA frame 720e received at time $t_0+4$ is received into frame buffer 740e. In the example, it is assumed that each incoming frame 720 is similar to a video I-frame, i.e., each frame encodes an entire HVA display image, and does not depend upon any preceding frames.

In the depicted example, in order to reduce the overall computational load on GPU 330, a method is utilized that produces a reduced rate HVD output data stream 715 where the HVD frames 780a-c are output at half the rate of the input HVA frames 720a-e. In this method, to reduce the frame rate of HVD output stream 715, the frame data in frame buffers 740b and 740d are simply discarded, thereby reducing the computation load on GPU 330 that would otherwise be needed to render and composite each frame. It is understood that other output frame rates could be chosen, depending on the amount by which the compute load on GPU 330 needs to be reduced in order to service all of its display contexts 555, and on the desired performance of the HVD sessions with individual endpoints 165. For example, two HVD frames 780 may be output for every three HVA frames 720 that are received. Depending on the ratio of incoming HVA frames 720 to outgoing HVD frames 780, a user of endpoint device 165 may notice jerkiness in the display, for example the moving user element 735 may appear to pop from location to location in the HVD display 780, however such jerkiness may be tolerated in order to maintain the HVD session with the middlebox 160.

Other methods of reducing the overall computational load may be used. In one example embodiment, the VDI protocol may encode a first HVA frame 720a as a standalone I-frame-like frame, but encode a number of subsequent frames as the difference between the window represented by the frame and the window represented by the standalone frame, e.g., as P-frame-like frames. In this embodiment, the frame rate of HVD output stream 715 is constrained or reduced to the rate at which standalone frames 720 are received. The configuration depicted in FIG. 7 may be achieved via this example method if HVA frames 720a, 720c, and 720e are standalone frames and HVA frames 720b and 720d are difference frames.

In a different example embodiment, the middlebox 160 may send messages over HVA VDI sessions 205 to request that the hosts 105 reduce the rate at which they send HVA frames 720 over the VDI sessions 205. This reduction in frame rate will reduce the load on the GPUs 330, because it will receive fewer frames and thus have fewer frames to render. For example, a very high HVA frame rate of 60 frames per second (fps) may be reduced to 45 fps, 30 fps, or an even lower rate without substantial degradation of the virtual application experience, and even a low HVA frame rate of 15 fps may be reduced to 10 fps or 5 fps without destroying the user's ability to function in the reduced frame environment.

Figure 8A:
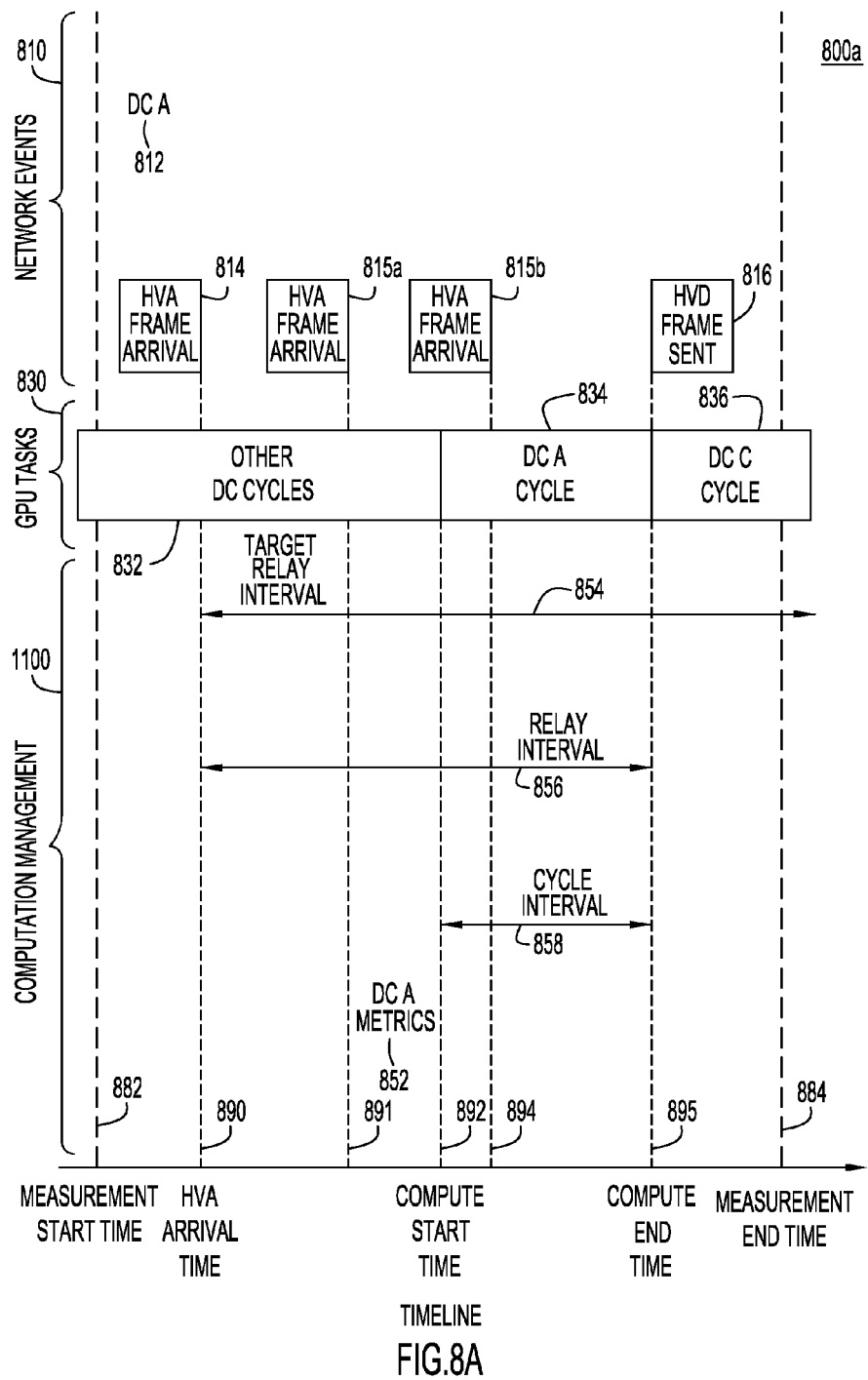
FIGS. 8A and 8B are examples of timelines illustrating the timing of activation and processing of display contexts in a GPU dual-port memory of the middlebox.
Figure 8B:
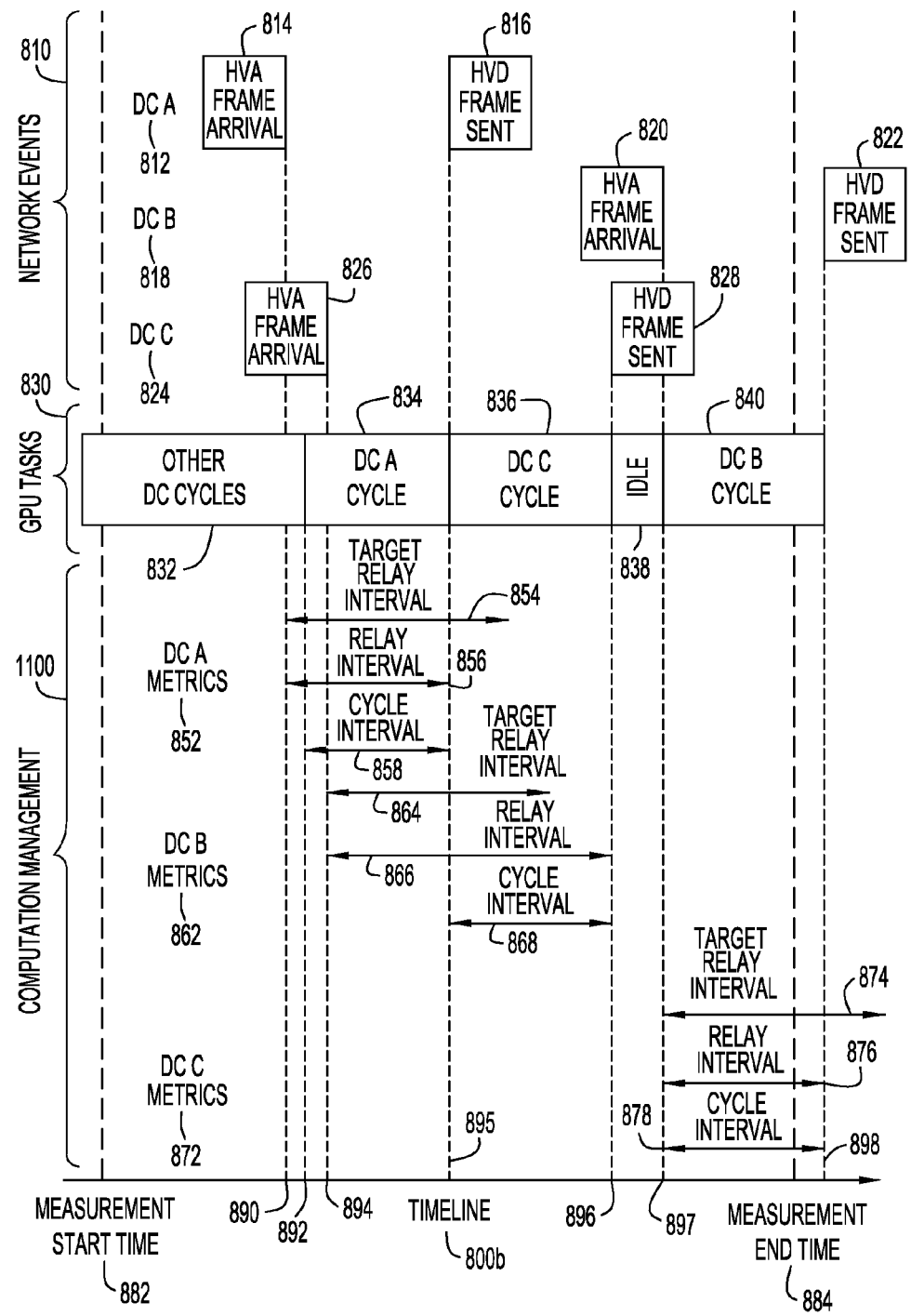

FIGS. 8A and 8B are an examples of timelines 800a, 800b illustrating the timing of activation and processing of display contexts in a GPU 330 and GPU dual-port memory 345 of the middlebox 160. The timelines 800 illustrates an example of how display contexts (DCs) 555 are scheduled and executed by GPU 330, and how GPU congestion or overload conditions are detected and managed. In general, GPU tasks 830 are scheduled in response to network events 810, and the execution of those tasks results in the collection of timing metrics by GPU computation management process 1100, which uses the metrics to compute whether GPU congestion or overload is present, and how to throttle the compute resources of subsequent GPU tasks.

A key role of the middlebox 160 is to minimize the delay incurred between the receipt of HVA data 705 and the relay of HVD data 715 reflecting the HVA change to the endpoint. However, middlebox 160 should also fairly support all endpoints 165 attached to it. To balance these two requirements, middlebox 160 maintains a "target frame relay interval" (also called the "target relay interval") variable. As each display context 555 executes, a "frame relay interval" (also called "relay interval") is measured from the time that an HVA data frame is fully received, and when the associated HVD data frame is submitted for transmission. As long as the measured frame relay interval of all display contexts is less than the target frame relay interval, the GPU is assumed not to be congested. If, however, the frame relay interval of any display context is measured to be greater than the target frame relay interval, then the GPU is assumed to be congested, and steps are taken to throttle the execution of some display contexts.

In GPU 330, display contexts (DCs) are enqueued on the ready list 650 upon HVA arrival. The GPU process then dequeues each ready display context in the order in which it was enqueued, sets the GPU state to that specified in the display context, runs to completion the rendering of any HVA frames received and any desktop changes since the previous time that the DC was run, and submits an HVD frame for transmission to the endpoint, before executing the next display context on the ready list 650.

The period between beginning execution of a display context to process one or more HVA frames and the time when the GPU stops executing the DC is called a display context (DC) cycle. During execution of a DC cycle, the display context performs one or more tasks selected from the group consisting of decoding the HVA display data, rendering the HVA display data and the desktop data, compositing the HVA display data and the desktop data, and encoding the HVA display data and the desktop data. The computational resources consumed by a display context during its DC cycle may be less than the frame relay interval, due to the fact that the display context is required to wait its turn in the ready list 650. Hence, the display context's "cycle interval", defined as the interval of time that a DC cycle consumes, is also measured. Both the frame relay interval and the cycle interval for a given DC cycle are captured by saving three time metrics: the "HVA arrival time", the "compute start time", and the "compute end time" in the display context. After all tasks for this DC cycle are completed, the display context sends an event comprising a reference to itself along with the time metrics to a GPU computation management process 1100. It is understood that, while these time metrics are described as part of the display context, in certain example implementations they may reside in a separate data structure with a reference to the display context, in the CPU memory 325, or in the GPU memory 345.

The relationship between the time metrics and the frame relay interval and cycle interval variables for the DC cycle may be understood with reference to FIG. 8A, which depicts the DC cycle 834 of display context A 812 (referred to as "DC A cycle"). The DC A cycle 834 comprises a number of network events, including the arrival of the first HVA frame 814 to be processed in the next DC A cycle at time 890, the arrival of subsequent HVA frames 815a at time 891 and the arrival of frame 815b at time 894. It will be appreciated that, in some embodiments, frame 815b will not be processed in DC A cycle 834, because it isn't completely received until after DC A cycle 834 has already begun. After all HVA frames 814, 815a have been decoded, rendered, composited with desktop display 230, and the HVD frame containing HVD Display 225 encoded, the encoded HVD frame 816 is submitted for transmission at time 895. The "HVA arrival time" metric for DC A cycle is assigned to be time 890 (the time at which first HVA frame 814 was received) because the arrival of the first HVA frame 814 causes display context A to be placed on the GPU's ready list 650. The "compute start time" metric for DC A cycle is assigned to be time 892, when execution of the DC A cycle 834 for display context A actually begins. The "compute end time" metric for DC A cycle is assigned to be time 895, when execution completes and HVD frame 816 is submitted for transmission. An event containing the metrics 852 for DC A cycle 834 is sent to GPU computation management process 1100. Because target relay interval 854 is greater than relay interval 856 for display context A, no congestion is detected.

It is noted that for the depicted display context A, the "compute start time" 892 is later than the "HVA arrival time" 890, because other DC cycles 832 are executing ahead of display context A. However, as shown in FIG. 8B with respect to DC B cycle 840, the "compute start time" may sometimes be the same as the "HVA arrival time" if the DC cycle does not have to wait for execution. It is understood that multiple HVA frames, on the same or different HVA sessions, may arrive and be processed in a single DC cycle, however, because the example embodiments are designed to minimize overall latency, the frame relay interval is always computed from the arrival time of the first HVA frame to be processed in the cycle. It is noted that the time consumed by receipt of HVA frames and transmission of HVD frames is not counted either as part of the frame relay interval or as time contributed to the cycle interval. It is assumed that transport of HVA and HVD VDI messages is handled by a separate, fairly simple, process or processes, which may be implemented in any suitable manner, for example, as CPU processes.

Computation management process 1100 defines an arbitrary measurement interval, starting at a measurement start time 882 and ending at a measurement end time 884. The measurement interval is unsynchronized with respect to any of the DC cycles, and metrics are computed for each successive measurement interval. The measurement interval should be long enough that computation management process 1100 can compute metrics at least once for active display contexts, i.e., display contexts that have HVA activity that changes the HVA display, currently resident on GPU 330. Computation management process 1100 receives events for each DC cycle that completes, as well as an event at the end of each measurement interval (which is also the beginning of the next measurement interval). For all DC cycle events occurring during the measurement interval, it computes a relay interval and, if the relay interval exceeds the target relay interval, it sets a "target relay interval exceeded" flag, triggering computational throttling at the beginning of the next measurement interval, as is further described with respect to FIG. 11.

Computation management process 1100 also generates the cycle interval for each cycle event it receives. The cycle interval is added to a "current measurement interval compute load" value, which represents the total amount of GPU time consumed by all DC cycles in the current measurement interval. A special case occurs when a DC cycle straddles a measurement interval boundary, for example the depicted DC C cycle 836 in FIG. 8A. To handle these special cases, the management process also maintains a "previous interval compute load" value. When a DC cycle event is received, if its compute start time is less than the measurement cycle start time and its compute end time is greater than measurement cycle start time, then the cycle interval is apportioned between the previous cycle and the current cycle.

Because HVA activity is bursty and the cycle time for a given display context can vary depending on how many HVA frames are received and the size and complexity of the HVA frames that are received, both the interval compute load and each DC cycle interval are smoothed over time, for example using a moving average, exponential smoothing, or any other suitable smoothing method. The values needed to compute and smooth the DC cycle interval are stored in the display context and the values for the interval compute load are stored as part of the computation management process 1100. It will be understood that the smoothed interval compute load is updated by the previous interval compute load, not the current interval compute load, so that any cycles straddling the measurement boundaries 882 or 884 have time to be incorporated into the values.

The timeline 800b in FIG. 8B illustrates not only the DC cycle for display context A 812, but also the DC cycles for display contexts B 818 and C 824. Because the frame relay interval for each DC cycle is always computed from the arrival time of the first HVA frame to be processed in the cycle, in this timeline 800b only the first HVA frame 814, 820, 826 for each DC cycle is shown. As noted with respect to FIG. 8A, because the target relay interval 854 is greater than relay interval 856 for display context A, no congestion is detected. It will be noted that the scenario depicted in this example is different from that in FIG. 8A in several particulars; for example, only one HVA frame for each of the 3 DCs 812, 818, 824 is received per cycle, and DC C cycle 836 does not straddle the measurement end time boundary 884. However, for conciseness, the arrival and processing of DC A is assumed to be otherwise the same as in FIG. 8A.

The first HVA frame 826 arrives for display context C 824 at time 894, which becomes the "HVA arrival time" for DC C cycle 836. Because DC C cycle 836 cannot begin until DC A cycle 834 completes, execution of DC C cycle 836 does not begin until time 895. Accordingly, the "compute start time" for DC C is assigned to be time 895. DC C cycle 836 runs until HVD frame 828 is submitted for transmission at time 896, and therefore the "compute end time" metric for DC C cycle is assigned to be time 896. An event containing display context C's metrics 862 is sent to computation management process 1100. In this case, management process 1100 detects that the relay interval 866 for DC C cycle 836 is greater than the target relay interval 864, the process 1100 sets the target relay interval exceeded flag.

At this point (time 896), no new HVA frames are present on the GPU. The GPU therefore goes idle (GPU task 838), executing no cycles until the arrival of the first HVA frame 820 for display context B 818 at time 897. It will be noted that the measurement cycle depicted in FIG. 8B is in the apparently paradoxical condition that the GPU is not 100% loaded, but that the congestion condition exists. This condition is an artifact resulting from the lack of synchronization between the measurement intervals and the DC cycles, and because the same display context can execute more than one cycle in a given measurement interval. The congestion condition exists simply because the execution of the cycles for display context A and the other display contexts before it caused the DC cycle 836 for display context C to be delayed long enough to trigger congestion.

Because the GPU is currently idle, there is no delay in beginning the cycle 840 for display context, so the HVA arrival time and compute start time for DC B cycle 840 are identical (time 897). The HVD frame 822 is submitted for transmission and the cycle completes at time 898, and therefore the "compute end time" metric for DC B cycle is assigned to be time 898. An event containing display context B's metrics 872 is sent to computation management process 1100. For DC B cycle 840, the relay interval 876 is determined to be less than the target relay interval 874, which is largely irrelevant, because the target relay interval exceeded flag is already set. However, in this case, because DC B cycle 840 straddles that end of the measurement interval (time 884), the cycle interval 878 for the DC B cycle is apportioned between the previous and current compute load values for management process 1100.

Figure 9A:
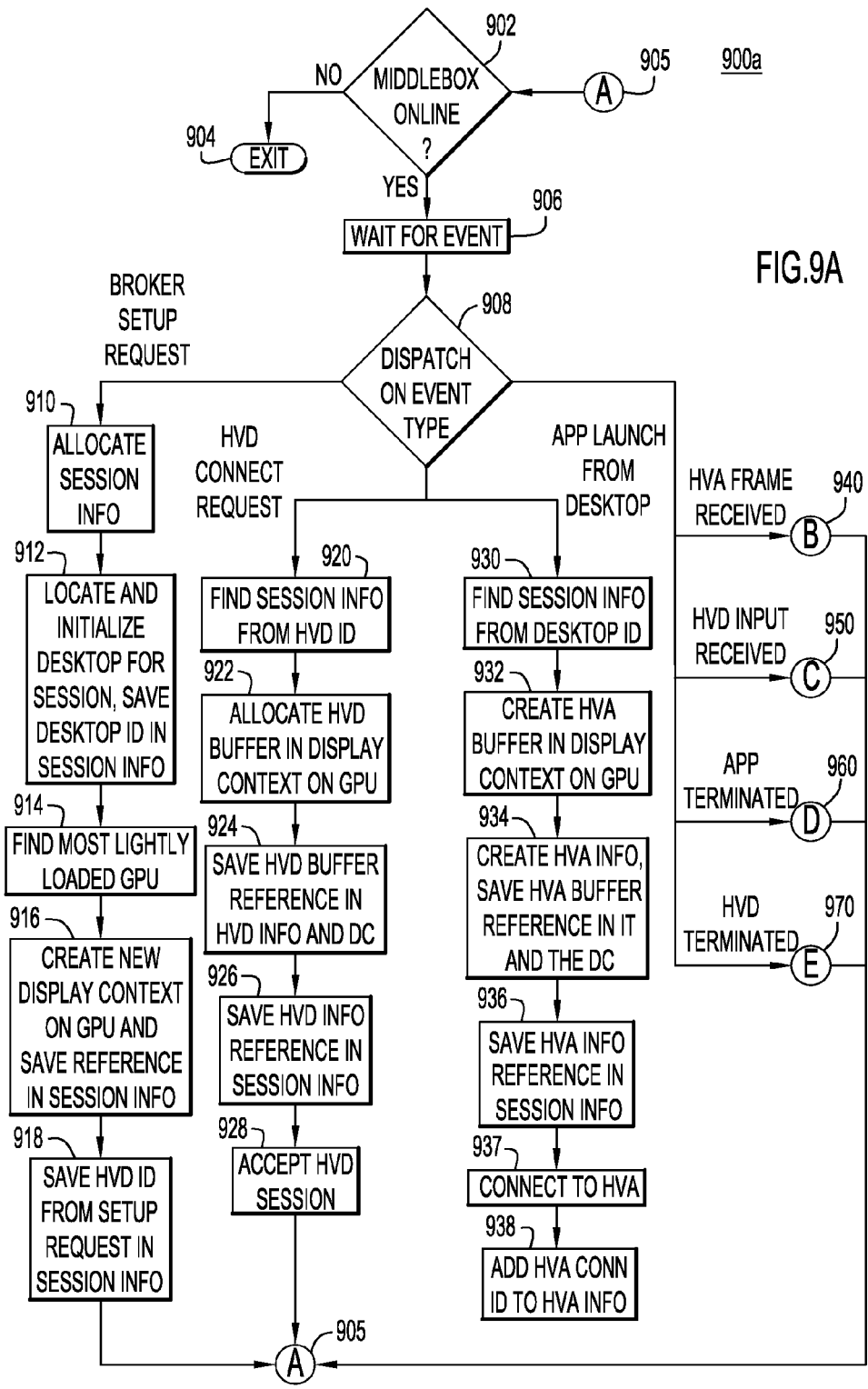
FIGS. 9A and 9B are an example of a flow chart generally depicting operation of a CPU process at the middlebox during a typical endpoint session between the middlebox and a client endpoint device in the VDI environment.
Figure 9B:
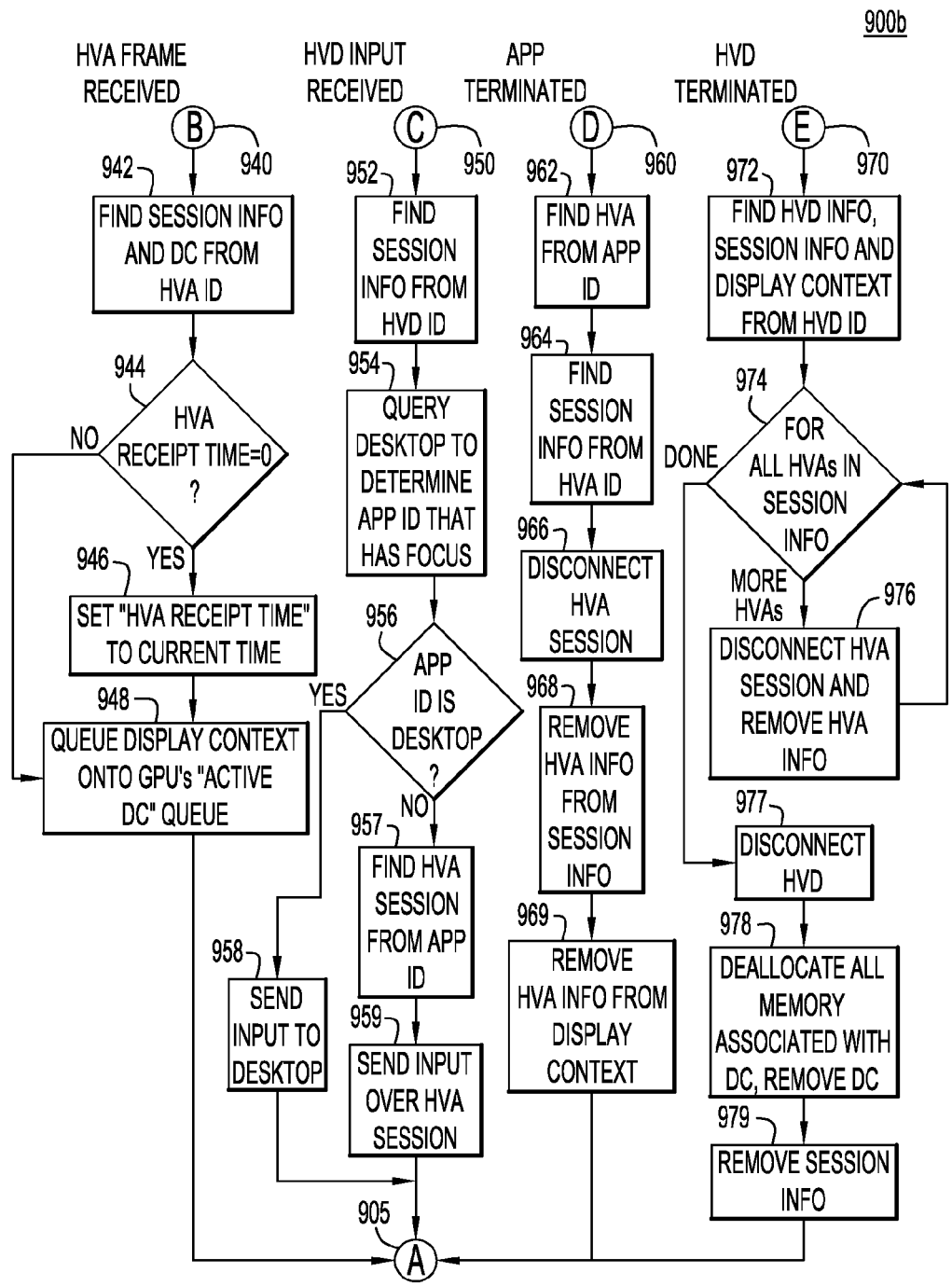

FIGS. 9A and 9B are an example of a flow chart generally depicting operation of a CPU process 900 at the middlebox 160 during a typical endpoint session between the middlebox 160 and a client endpoint device 165 in the VDI environment. Process 900 handles HVA and HVD VDI session events, as well as various events pertaining to middlebox desktop processes. Process 900 is carried out by the control CPU 305, and runs in a continuous loop that begins at step 902, where the CPU determines whether the middlebox 160 is still online. If not, the process exits at step 904, but if yes, then the CPU waits for an incoming event at step 906. The incoming event may be received from a VDI broker 155, a client endpoint device 165, a desktop process 240 on the middlebox, from the HVAs 125 on the host servers 105.

In step 908 the CPU determines the type of event received in step 900, and processes the event according to a particular path before returning to step 902. FIG. 9 presents a few examples of common events that may occur in the same or similar form in different example embodiments of the middlebox, and it is understood that the depicted events may be modified or varied from those depicted.

If the event is a broker setup request from VDI broker 155, then at step 910 the CPU allocates session information 605. At step 912, CPU locates or creates the desktop information 610 associated with the user specified in the setup request and instantiates a desktop process 240 for it, saving a reference (the desktop identifier or ID) to the desktop information 610 in the session information 605. At step 914, the CPU locates the most lightly loaded GPU 330 and at step 916 creates a new display context 555 on that GPU, and saves a reference to the created display context 555 in session information 605. It will be understood that the most lightly loaded GPU can be determined by examining each GPU's measurement interval compute load, smoothed over time. The broker setup request comprises the identifier of an HVD (the HVD ID), but does not comprise connection information for the HVD because the connection has not yet been established. In step 918, the CPU saves the HVD ID in the session information 605. The process then loops back to step 902.

If the event type is an HVD connect request from client endpoint device 165, 166, then in step 920 the CPU uses the HVD ID in the HVD connect request to locate the proper session information 605 for the HVD. At step 922, the CPU allocates an HVD buffer 645 in an area of GPU memory 345 associated with the created display context 555, and in step 924 saves a reference to the buffer 645 in the HVD information 620 and display context 555. In step 926, the CPU saves a reference to the HVD information 620 in the session information 605. The CPU then accepts the HVD session 210 at step 928, and the process loops back to step 902.

In the depicted embodiment, it is assumed that the endpoint 165, 166 first contacts the VDI broker 155, and the VDI broker 155 then sends a broker setup request to middlebox 160 after the middlebox has been selected by the broker. The broker then refers the endpoint to the middlebox, resulting in the HVD connection request. It will be understood that, in another embodiment, the broker setup request and the HVD connect request may be consolidated, for example, by the broker 155 merely referring the endpoint 165, 166 to the middlebox 160, without sending the broker setup request. In this embodiment, process 900a will, upon receiving the HVD connect request, execute a procedure similar to steps 910-918 before continuing on to execute steps 920-928. Although only a single HVD request is described for the endpoint 165, 166, it is understood that an HVD request may be made for each HVD session with an individual endpoint 165, 166, for example, in an example embodiment where two HVD sessions are desired to be sent to an individual endpoint 165, the broker sends two HVD requests to the middlebox (or middleboxes), one HVD request for each HVD session to be established.

If the event type is an application launch request from the desktop process(es) 240, then at step 930 the CPU uses the desktop ID to find the associated session information 605. At step 932, the CPU allocates an HVA buffer 635 in an area of GPU memory 345 associated with the display context 555, and at step 934 the CPU allocates an HVA information block 615 and saves a reference to the buffer 635 in both the HVA information block 615 and the display context 555. In step 936, the CPU saves a reference to the HVA information block 615 in the session information 605. In step 937, the CPU establishes an HVA connection 205, in step 938 saves the connection reference (an HVA session ID identifying the HVA connection) in HVA information block 615, and then the process loops back to step 902.

Turning now to FIG. 9B, if the event is an HVA frame receipt notification, then at step 942 the CPU locates the session information 605 and display context 555 using the HVA session ID in the notification event. At step 944, the CPU checks the display context 555 to determine whether the HVA receipt time value is zero. A zero value indicates that this received frame is the first HVA frame received for the upcoming cycle. If the value is zero, then in step 946 the CPU sets the HVA receipt time to the current time, and if the value is not zero, step 946 is skipped. In step 948, the CPU queues the display context 555 on the GPU's ready list 650, and the process then loops back to 902.

If the event is the receipt of an HVD input, for example an indication that the user at endpoint 165 struck a key or manipulated the mouse, then at step 952 the CPU locates the session information 605 associated with the input using the HVD ID in the event. At step 954, the CPU queries the desktop information 610 associated with the located session information 605 to determine the ID of the application (the application ID) that has focus, that is, the application to which the HVD input should be directed. In step 956, if the application ID refers to the desktop, the input is sent to the desktop at 958, and the process then loops back to 902. If the application ID does not refer to the desktop, then at 957 the CPU uses the application ID to locate the HVA information 615 and at step 959 the CPU relays the input to the appropriate HVA by sending it over the HVA session 205. The process then loops back to 902.

If the event is an indication that an application was terminated, then at step 962 the CPU locates the associated HVA information 615 using the application ID in the event, and in step 964 uses the located HVA information 615 to locate the associated session information 605. At step 966, the CPU disconnects the HVA session, and at step 968 removes the reference to the HVA information 615 from session information 605. At step 969 the CPU de-allocates the HVA buffer 635 and removes references to the HVA buffer 635 and the HVA session information 615 from the display context 555. The process then loops back to 902.

If the event indicates that the HVD was terminated, then at step 972, the CPU uses the HVD ID from the event to locate the associated HVD information 620, session information 605, and the display context 555. At step 974, the CPU enters a loop where all HVA information blocks 615 in the session information 605 are scanned, and in step 976, for each HVA information 615 found, the CPU disconnects its HVA session 205 and destroys the HVA information 615. When all HVAs have been scanned, then in step 977 the CPU disconnects the HVD session 210 and destroys the HVD information 620. In step 978, the CPU removes (deallocates) all memory associated with the display context 555, including HVA buffers 635, working buffers 640, HVD buffer 645, and the display context 555 itself, and removes all references to the display context from the GPU. In step 979 the CPU removes the session information 605. The process then loops back to 902.

Figure 10:
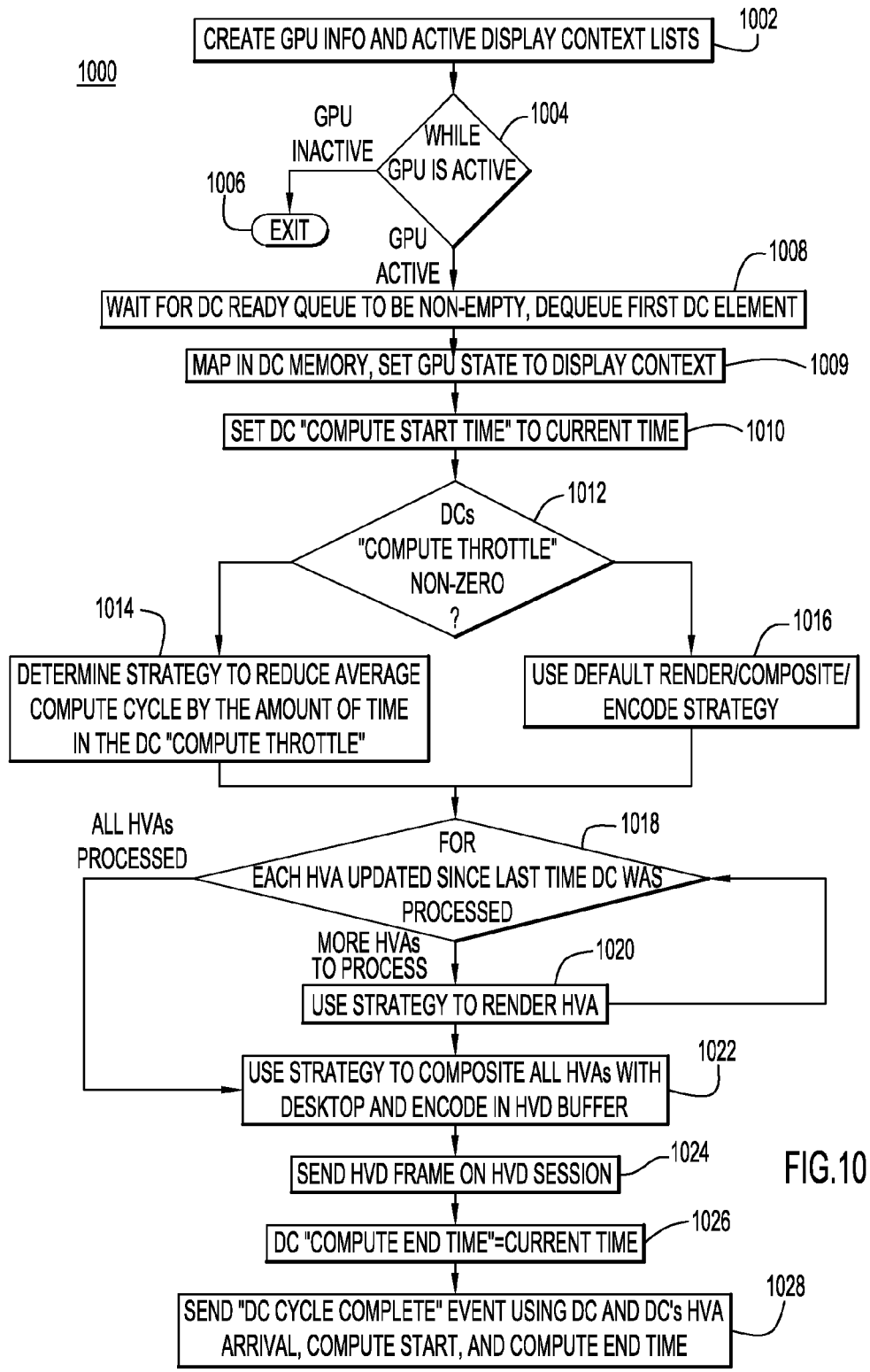
FIG. 10 is an example of a flow chart generally depicting operation of a GPU process 1000 that manages the display context processing cycle at the middlebox during a typical endpoint session between the middlebox and a client endpoint device in the VDI environment.

FIG. 10 is an example of a flow chart generally depicting operation of a GPU process 1000 that manages the display context processing cycle at the middlebox across all endpoint sessions between the middlebox 160 and client endpoint devices 165, 166 in the VDI environment. Process 1000 manages the display context ready queue and allocates cycle time as display contexts become ready, and is executed on each GPU 330 in the middlebox 160.

At step 1002, global GPU information 625 is initialized, including the display context list 655 and the display context ready list 650. At step 1004 the GPU process enters a loop that continues until the GPU is no longer active, when it exits at 1006. If the GPU is active, then at step 1008 the GPU waits for a display context 555 to be placed on the ready list 650, at which time the first display context 555 on the queue is removed. It will be understood that if a DC is already on the ready list, then it is merely dequeued without the GPU becoming idle. In step 1009, the GPU uses the display context information 555 to map the proper chunk of physical memory 550 into the overlay address space 560, and loads the current display context state, including all registers for GPU 330 into GPU 330. In step 1010, the GPU begins the display context execution cycle and sets the compute start time to the current time.

At step 1012, the GPU determines whether the display context's throttle value, the setting of which is described in FIG. 11, is non-zero. If it is, then at step 1014 the GPU determines a strategy to reduce the average cycle interval of the display context by the time interval currently specified by the throttle, for example by using methods similar to those described for FIG. 7 that are appropriate for the VDI protocol being used in a particular example implementation. If the throttle value is zero, then at 1016 the default strategy, which may decode and render all HVA information, is set. The GPU then proceeds in both cases to step 1018.

In step 1018, the GPU scans each HVA session 205 associated with display context 555 that has unprocessed frames, and at step 1020 applies the determined cycle reduction strategy to decode and render the HVA frames. Once all HVA sessions 205 have been scanned, at step 1022 the GPU uses the determined strategy to composite all HVAs with the current desktop image, using working buffers 640 as necessary, and encode the resultant image into the HVD buffer 645. It is understood that the actual process of decoding, rendering, compositing, and encoding is dependent upon the structure of the HVA and HVD session protocols, and a different method may be needed for different protocols. For example, HVA frames may be decoded and immediately re-encoded into the HVD buffer, or a multi-processor pipeline may have different graphics elements 340 performing different decode, render, composite, and encode tasks at different times. At step 1024, the GPU sends the encoded HVD frame on the HVD session, and in step 1026 sets the display context compute end time to the current time. In step 1028, the GPU sends a DC cycle complete event with the HVA arrival, compute start, and compute end metrics to computation management process 1100. The process then loops back to step 1004 to process additional DC cycles.

Figure 11A:
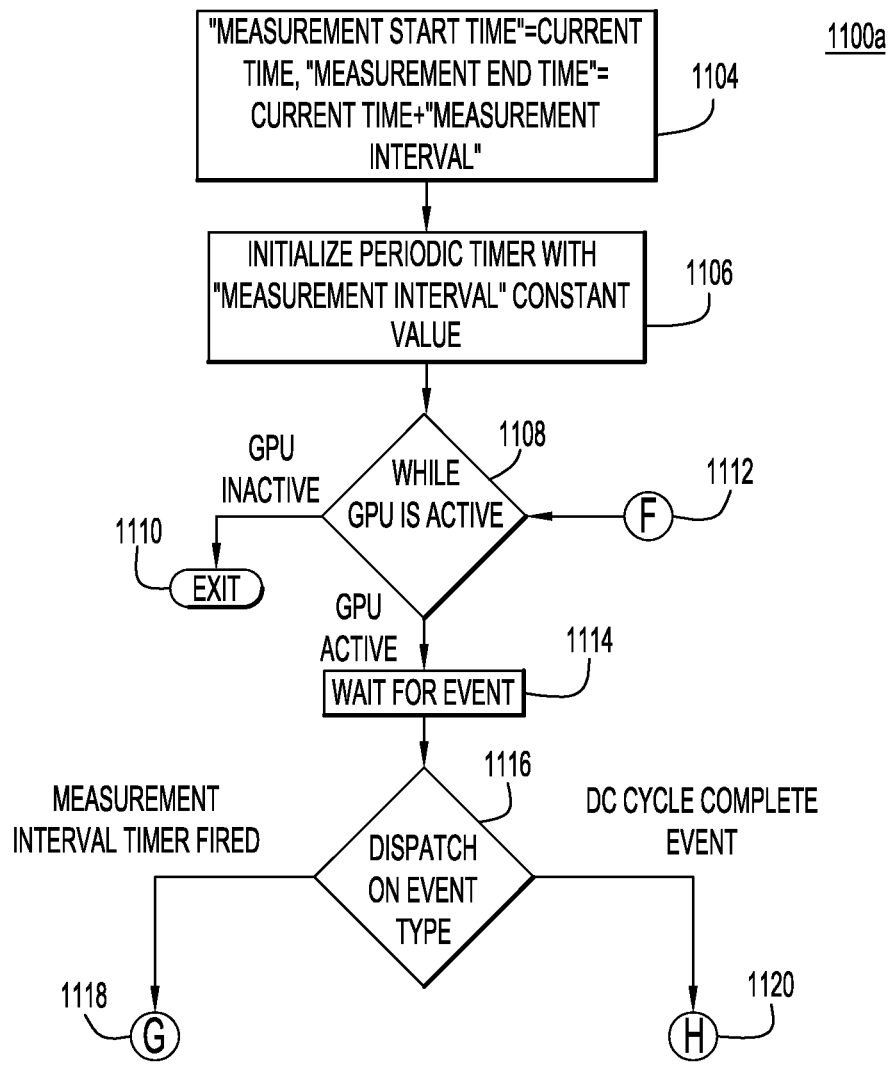
FIGS. 11A through 11C are an example of a flow chart generally depicting operation of a GPU computation management process at the middlebox during a typical endpoint session between the middlebox and a client endpoint device in the VDI environment.
Figure 11B:
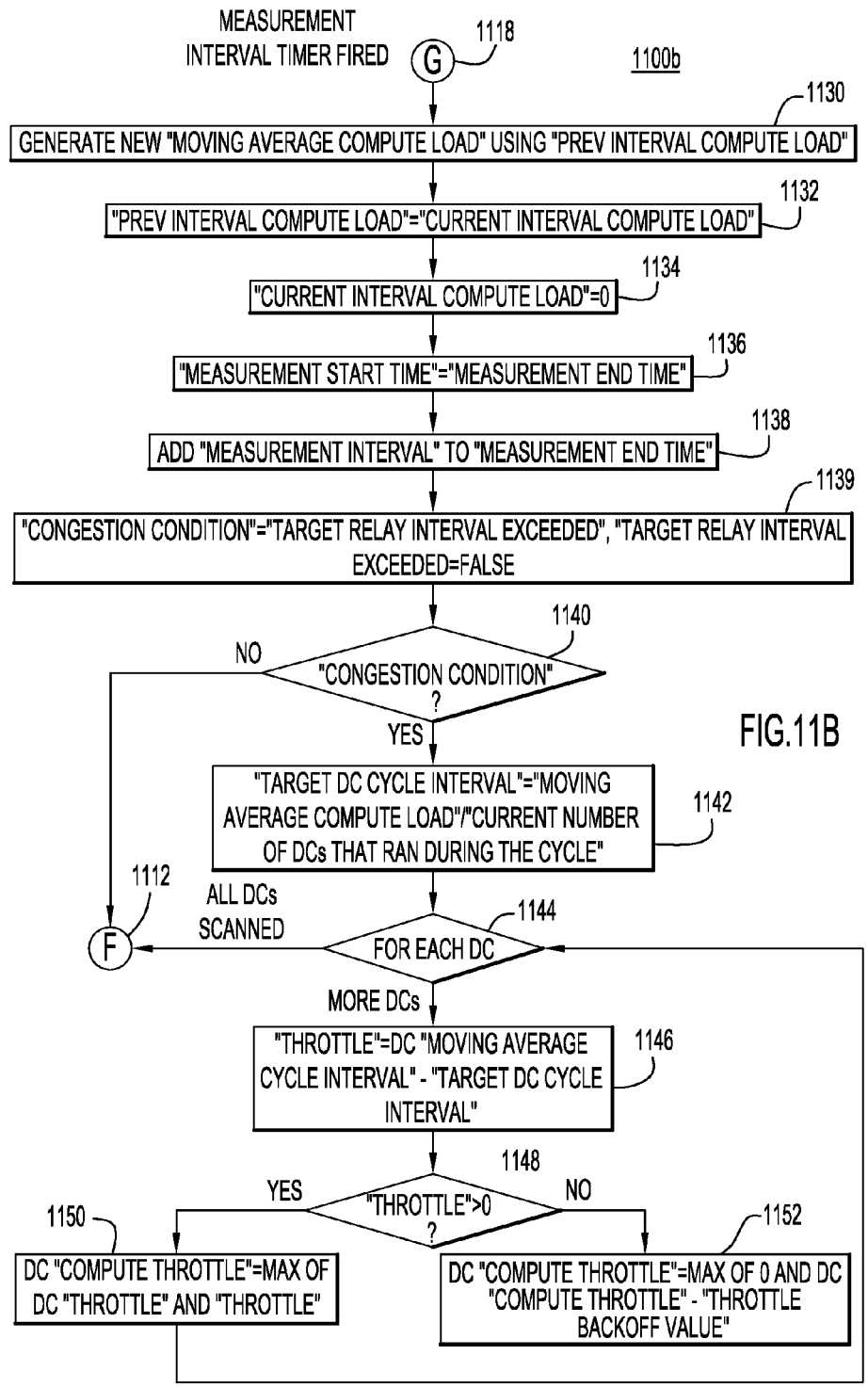
Figure 11C:
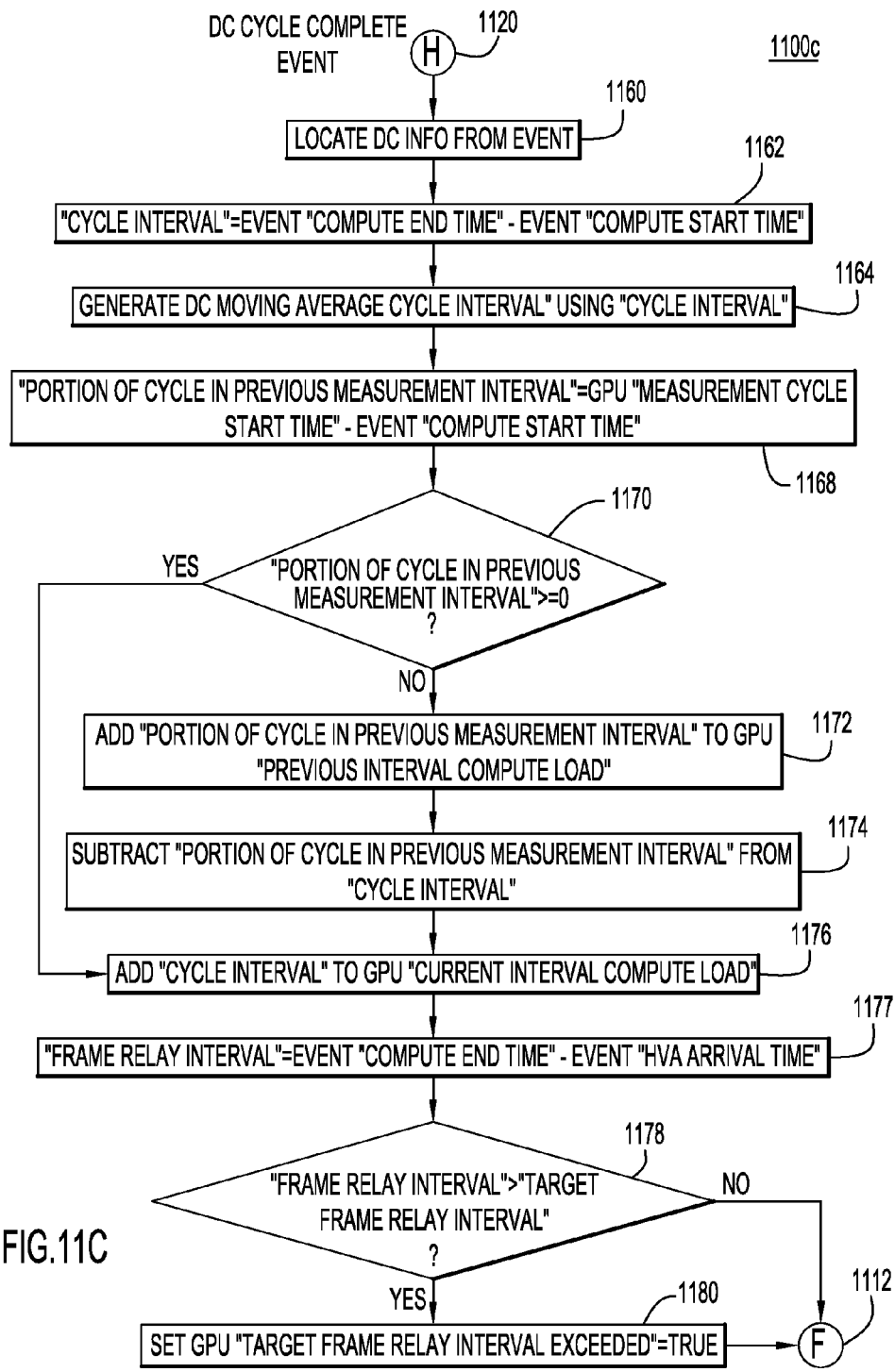

FIGS. 11A through 11C are an example of a flow chart generally depicting operation of a GPU computation management process 1100 at the middlebox 160 across all endpoint sessions between the middlebox 160 and client endpoint devices 165, 166 in the VDI environment. Process 1100 uses a repeating measurement cycle to receive DC cycle metrics, determine whether GPU congestion conditions have arisen, and compute throttle values for display context if congestion conditions do arise. This process was also described with respect to FIG. 8. It is understood that this process 1100 has a relatively low duty cycle, and as such it may be run on the control CPU 305 or on each GPU 330 of the middlebox 160. Accordingly, the process 1100 will be described hereinafter as run by a "processor" which may be either of the control CPU 305 or an individual GPU 330. Regardless of which processor performs process 1100, the example embodiments should run one instance of process 1100 per active GPU 330.

In the following description of the example embodiment of FIG. 11, several variables are described as "moving averages", for example the "moving average compute load" and the "moving average cycle interval." It is understood that in other example embodiments, the same variables may not be moving averages, and instead may be smoothed over time in a different manner such as, for example, exponential smoothing, low-pass filtering, or any other suitable smoothing method, and that the process of FIG. 11 may be adapted for use with such other smoothed variables.

Referring now to FIG. 11A, at step 1104 the processor sets the "measurement start time" value to the current time, and sets the "measurement end time" to the current time plus the "measurement interval" constant value. At step 1106, the processor initializes a periodic timer to generate an event once every measurement interval. At step 1108, a loop begins that will continue until the GPU is no longer active, at which point the process will exit at step 1110. If the GPU remains active, the computation management process waits for an event at step 1114. When an event is received, the processor in step 1116 dispatches based on the event type.

Referring now to FIG. 11B, if the event indicates that the measurement interval has expired, then the processor in step 1130 computes a new "moving average compute load" variable using the "previous interval compute load" variable (which currently contains the compute load of the interval from two intervals ago). The processor in step 1132 replaces the value of the previous interval compute load with the value of the "current interval compute load," and in step 1134 sets the current interval compute load to zero. The processor in step 1136 replaces the value of the measurement start time with the measurement end time, and in step 1138 sets the measurement end time to the current measurement end time plus the measurement interval constant. In step 1139, the processors sets a temporary "congestion condition" variable with the value of "target relay interval exceeded," so that target relay interval exceeded may be set to false as close to the measurement interval boundary as possible. At this point, all measurement interval-dependent variables have been set up for the new measurement cycle.

The process continues by checking the congestion condition value in step 1140. If it is false, then the processor returns to the top of the loop at step 1108 to process more events. If congestion condition is true, then at step 1142 the processor computes the "target DC cycle interval" by dividing the moving average of the compute load per measurement interval by the number of display contexts on the GPU that ran during the cycle. At step 1144, a loop is begun where the processor scans each display context active on the GPU 330, and when all display contexts are scanned returns to the top of the event loop at 1108 to process more events.

For each display context, in step 1146 the processor computes the value of a temporary "throttle" variable by subtracting the target DC cycle interval from the display context's expected cycle interval (which may be determined using, e.g., a moving average of cycle intervals), and in step 1148 determines if the throttle value is greater than zero (positive). If yes, then in step 1150 the processor sets the current "compute throttle" value for the display context to the greater of the current value of the "compute throttle" variable and the value of the temporary throttle variable, and then returns to step 1146 to scan the next display context. The compute throttle value has units of time interval, and represents an indication to the display context that it should reduce its expected cycle interval in subsequent cycles by the amount of the value, for example by using methods similar to those described for FIG. 7 that are appropriate for the VDI protocol being used in a particular example implementation. Step 1150 ensures that the throttle value will not be reduced if in a previous cycle, the display context had exceed the target cycle interval by an even greater amount.

If the temporary throttle is negative, then in step 1152 the compute throttle value is set to the maximum of zero or a constant "throttle backoff value" subtracted from the current value of compute throttle, and then returns to step 1146 to scan the next display context. Step 1152 ensures that, as a congestion condition clears up, the compute throttle value is slowly reduced to zero over several measurement cycles, so that display contexts don't constantly oscillate between throttled and unthrottled states due to system burstiness.

Referring now to FIG. 11C, if the event type indicates a DC cycle complete event, then the processor in step 1160 locates the display context from the display context reference in the event. In step 1162 the processor computes the cycle interval by subtracting the compute start time of the event from the compute end time of the event, and in step 1164 uses the cycle interval to generate the expected (e.g., moving average) cycle interval for the display context. In step 1168, the processor begins checking for cycles that straddle the measurement boundary by generating a "portion of the cycle interval in the previous measurement cycle" value by subtracting the DC compute start time of the event from the current "measurement interval start time" of the GPU.

In step 1170 the processor determines if the value of the "portion of the cycle interval in the previous measurement interval" is greater than or equal to zero. If yes, then the cycle did not straddle the measurement interval boundary, and the processor skips ahead to step 1176. If not, then in step 1172 the processor adds the value of the "portion of the cycle interval in the previous measurement interval" to the "previous interval compute load", and in step 1174 subtracts the value of the "portion of the cycle interval in the previous measurement interval" from the "cycle interval". In step 1176 the processor adds the current value of the cycle interval (which is either the computed value from step 1162 if the processor skipped steps 1172-1174, or the reduced value of the cycle interval from step 1176 if the processor performed steps 1172-1174) to the current interval compute load of the GPU.

In step 1177, the processor computes the frame relay interval by subtracting the HVA arrival time of the event from the compute end time of the event, and then in step 1178 determines if the frame relay interval is greater than the constant target frame relay interval. If yes, then in step 1180, the processor sets the "target frame relay interval exceeded" flag indicating a congestion condition, and then returns to step 1108. If not (the frame relay interval is less than or equal to the target frame relay interval), then the processor returns to the top of the event loop at step 1108, where another event will be processed. It will be understood from FIG. 11B that the "target frame relay interval exceeded" flag is cleared at the beginning of each cycle, in step 1139, so the value of this variable will be true only if no DC cycle exceeded the target frame relay interval.

The above description is intended by way of example only. The description of has been presented for purposes of illustration and description, but is not intended to be exhaustive or limited to the embodiments in the form disclosed. Many modifications and variations will be apparent to those of ordinary skill in the art.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

With respect to the Figures, which illustrate the architecture, functionality, and operation of possible implementations of methods, apparatuses, and computer readable storage media encoded with instructions, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A method comprising:
receiving at a network device, via one or more Hosted Virtual Application (HVA) Virtual Desktop Interface (VDI) sessions between the network device and a first HVA host device, a plurality of first sets of HVA display frames, each first set of HVA display frames from a different one of a plurality of HVAs resident on the first HVA host device;

receiving a Hosted Virtual Desktop (HVD) setup request, wherein the HVD setup request comprises identifying a first client endpoint device;

allocating resources to support the first client endpoint device;

instantiating a desktop process for the first client endpoint device, wherein the desktop process generates first desktop display data;

establishing a first HVD VDI session between the network device and the first client endpoint device in response to the receipt of the HVD setup request;

executing a display context cycle for a first display context to generate a first set of HVD display frames from the plurality of first sets of HVA display frames and the first desktop display data, wherein the first set of HVD display frames comprises one or more HVD display frames; and sending the first set of HVD display frames to the first client endpoint device via the first HVD VDI session.

2. The method of claim 1, wherein the generation of the first set of HVD display frames comprises performing one or more tasks selected from the group consisting of:

decoding the plurality of first sets of HVA display frames, rendering at least one of the HVA display frames from each first set of HVA display frames, rendering the first desktop display data, compositing the rendered HVA display frames and the rendered first desktop display data, and encoding the first set of HVD display frames.

3. The method of claim 1, further comprising:

receiving at the network device, via one or more Hosted Virtual Application (HVA) Virtual Desktop Interface (VDI) sessions between the network device and a second HVA host device, one or more second sets of HVA display frames, each second set of HVA display frames from a different HVA resident on the second HVA host device.

4. The method of claim 1, further comprising:

receiving at the network device one or more second sets of HVA display frames, each second set of HVA display frames from a different HVA resident on either the first HVA host device or a second HVA host device;

generating second desktop display data;

executing a display context cycle for a second display context to generate a second set of Hosted Virtual Desktop (HVD) display frames from the one or more second sets of HVA display frames and the second desktop display data; and sending the second set of HVD display frames to a second client endpoint device via a second HVD VDI session between the network device and the first client endpoint device if the second set of HVD display frames comprises at least one HVD display frame.

5. The method of claim 4, wherein the first and second display contexts are executed in a Graphics Processing Unit (GPU) in the network device.

6. The method of claim 5, wherein the GPU comprises an address space, and further comprising:

allocating the first and second display contexts from first and second portions of a physical memory in the network device, wherein the physical memory is larger than the GPU address space; and mapping the first and second portions of the physical memory into an overlay address space so that the GPU is able to access the first and second portions of the physical memory.

7. The method of claim 1, wherein said generation of first desktop display data is performed by a first desktop process on the network device.

8. The method of claim 7, further comprising:

receiving user input from an input device associated with the first client endpoint device via the first HVD VDI session;

determining which one of either the first desktop process or one of the one or more HVAs is associated with the user input; and sending the user input from the network device to the determined HVA or desktop process.

9. The method of claim 1, wherein allocating resources further comprises:

selecting a graphics processing unit (GPU) to support the first client endpoint device from a set of GPUs on the network device.

10. The method of claim 9, wherein the desktop process comprises a virtual machine executing on the network device.

11. A method comprising:

establishing a plurality of Hosted Virtual Desktop (HVD) Virtual Desktop Interface (VDI) sessions between a network device and a plurality of client endpoint devices, wherein each HVD VDI session is associated with a single display context in the network device and a single client endpoint device; and for each HVD VDI session:

receiving at the network device a plurality of sets of Hosted Virtual Application (HVA) display frames via one or more HVA VDI sessions between the network device and one or more HVA host devices, wherein each set of HVA display frames is generated by an HVA resident on one of the one or more HVA host devices;

generating desktop display data;

executing a display context cycle for the associated display context to generate a set of HVD display frames from received sets of HVA display frames and the desktop display data, wherein the set of HVD display frames comprises one or more HVD display frames;

sending the set of HVD display frames to the associated client endpoint device via the HVD VDI session; and repeating said receiving, generation, executing and sending steps until the HVD VDI session is terminated.

12. The method of claim 11, further comprising:

establishing a periodic measurement interval.

13. The method of claim 12, further comprising:

for each display context cycle, measuring an elapsed interval between the receipt of the first HVA display frame from the received sets of HVA display frames for that display context cycle and the completion of execution of the display context cycle;

setting a congestion trigger if the elapsed interval for any display context cycle is greater than a predetermined target frame relay interval; and clearing the congestion trigger if the elapsed interval for every display context cycle executed within the measurement interval is less than or equal to a predetermined target frame relay interval.

14. The method of claim 13, further comprising:
measuring, over the measurement interval, the sum of the elapsed intervals for every display context cycle executed during the measurement interval;
determining a target cycle interval;
for each display context, determining an expected cycle interval for the display context;
for each display context, applying a throttle to the display context if the expected cycle interval is greater than the target cycle interval, wherein the throttle specifies a reduction time by which the display context must reduce the expected cycle interval in subsequent display context cycles.

15. The method of claim 14, wherein one or more of the display contexts are resident in a Graphics Processing Unit (GPU) in the network device, and wherein determining the target cycle interval comprises:
dividing a compute load for the GPU by the number of display contexts in the GPU that executed a display context cycle during the measurement interval, wherein the compute load and the number of display contexts are smoothed over multiple instances of the measurement interval.

16. The method of claim 14, further comprising:
detecting that the congestion trigger is cleared;
for each display context to which a throttle was applied, incrementally reducing the throttle by a fixed amount over subsequent display context cycles.

17. The method of claim 13, further comprising:
detecting that the congestion trigger is set; and
reducing computation congestion by reducing the amount of computation during the repeated display context cycle.

18. The method of claim 17, wherein, for each display context,
said execution of the display context cycle comprises performing one or more display context tasks selected from the group consisting of rendering at least one HVA display frame from each of the plurality of sets of HVA display frames, compositing at least one HVA display frame from each of the plurality of sets of HVA display frames, and encoding the set of HVD display frames.

19. The method of claim 17, wherein, for at least one display context, each of the plurality of sets of HVA display frames comprises at least two standalone HVA display frames and at least one difference HVA display frame, and wherein said reducing the amount of computation further comprises skipping rendering of one or more of the difference HVA display frames from one or more of the sets of HVA display frames.

20. The method of claim 17, further comprising, for at least one display context:
sending a signal to one of the HVA host devices requesting that the signaled HVA host device reduce the frame rate for subsequent sets of HVA display frames from one or more HVAs resident on the signaled HVA host device to a requested reduced frame rate; and
receiving subsequent sets of HVA display frames from the signaled HVA host device, wherein the subsequent sets have a frame rate equal to or less than the requested reduced frame rate.

21. An apparatus comprising:
a control processor configured to:
establish a plurality of Hosted Virtual Application (HVA) Virtual Desktop Interface (VDI) sessions with one or more HVA host devices;
establish a plurality of Hosted Virtual Desktop (HVD) VDI sessions with a plurality of client endpoint devices, wherein each HVD VDI session in the plurality is associated with a single client endpoint device; and
generate a plurality of sets of desktop display data, one set for each established HVD VDI session;
a plurality of graphics processors, and, for each graphics processor a corresponding graphics memory communicably connected to the graphics processor and to the control processor, wherein each graphics memory is configured to:
receive and store a plurality of sets of HVA display data, each set of HVA display data from a single HVA via one of the plurality of HVA VDI sessions; and
receive and store the plurality of sets of desktop display data; and
wherein each graphics processor processes one or more of the plurality of sets of desktop display data, wherein for each set of desktop display data processed by an individual graphics processor, the graphics processor is configured to:
fetch the stored set of desktop display data and the stored one or more sets of HVA display data from the corresponding graphics memory;
generate a set of HVD display data by performing one or more tasks selected from the group consisting of decoding the received one or more sets of HVA display data, rendering the decoded sets of HVA display data with the set of desktop display data, compositing the rendered sets of HVA display data with the desktop display data, and encoding rendered and composited display data into HVD display data; and
send the generated set of HVD display data from the corresponding graphics memory for transfer to a client endpoint device via the HVD VDI session associated with the client endpoint device.

22. The apparatus of claim 21, further comprising a network interface controller configured to:
receive the plurality of sets of HVA display data from the one or more HVA host devices via the plurality of HVA VDI sessions;
transfer the received plurality of sets of HVA display data to the plurality of graphics memories; and
transfer each of the generated sets of HVD display data from the plurality of graphics memories to one of the plurality of client endpoint devices, wherein each generated set of HVD display data is transferred to a different client endpoint device via the HVD VDI session associated with the client endpoint device.

23. The apparatus of claim 21, wherein the control processor is further configured to, for each client endpoint device in the plurality of client endpoint devices:
receive an HVD setup request, wherein the HVD setup request comprises an identifier for an HVD VDI session associated with an individual client endpoint device; and
instantiate a desktop process for the identified client endpoint device, wherein the desktop process performs said generation of a set of desktop display data for the identified client endpoint device;
wherein said establishment of an HVD VDI session with the identified client endpoint device is in response to the receipt of the endpoint setup request.

24. The apparatus of claim 23, wherein each desktop process comprises a virtual machine.

25. The apparatus of claim 23, wherein the control processor is further configured to:
- receive user input from an input device associated with one of the client endpoint devices via the HVD VDI session associated with the client endpoint device;
- determine which of the plurality of HVAs or desktop processes is associated with the user input; and
- send the user input from the apparatus to the determined HVA or desktop processes via the HVA VDI session associated with the determined HVA.

26. The apparatus of claim 21, wherein each graphics processor comprises at least two display contexts and hardware support for context switching between the display contexts, and wherein each display context is configured to process a single set of desktop display data, each set of desktop display data associated with an individual client endpoint device.

27. The apparatus of claim 26, wherein each graphics processor comprises an address space and is further configured to:
- allocate each display context of the at least two display contexts from a portion of a physical memory in the corresponding graphics memory, wherein the physical memory is larger than the address space; and
- map each portion of the physical memory into an overlay address space so that the graphics processor is able to access each portion of the physical memory that has been allocated as a display context.

28. A system comprising the apparatus of claim 21, wherein one of the HVA VDI sessions is a high-bandwidth session, and the apparatus is co-located in an edge network with the HVA associated with the high-bandwidth HVA VDI session.

29. A system comprising the apparatus of claim 21, wherein at least one client endpoint device in the plurality of client endpoint devices is a zero client endpoint.

30. The apparatus of claim 21, wherein each graphics memory in the plurality of graphics memories is selected from the group consisting of dual-port memory and multi-port memory.

31. One or more computer readable storage devices encoded with instructions that, when executed by a processor, cause the processor to:
- establish a plurality of HVD VDI sessions between a network device and a plurality of client endpoint devices, wherein each HVD VDI session is associated with a single display context in the network device and a single client endpoint device; and
- for each HVD VDI session:
- receive at the network device a plurality of sets of Hosted Virtual Application (HVA) display frames via one or more HVA VDI sessions between the network device and one or more HVA host devices, wherein each set of HVA display frames is generated by an HVA resident on one of the one or more HVA host devices;
- generate desktop display data;
- execute a display context cycle for the associated display context to generate a set of HVD display frames from received sets of HVA display frames and the desktop display data, wherein the set of HVD display frames comprises one or more HVD display frames;
- send the set of HVD display frames to the associated client endpoint device via the HVD VDI session if the set of HVD display frames comprises at least one HVD display frame; and
- repeat said receiving, generation, executing and sending steps until the HVD VDI session is terminated.

32. The one or more computer readable storage devices of claim 31, wherein the instructions further cause the processor to:
- establish a periodic measurement interval;
- for each display context cycle, measure an elapsed interval between the receipt of the first HVA display frame from the received sets of HVA display frames for that display context cycle and the completion of execution of the display context cycle;
- set a congestion trigger if the elapsed interval for any display context cycle is greater than a predetermined target frame relay interval; and
- clear the congestion trigger if the elapsed interval for every display context cycle executed within the measurement interval is less than or equal to a predetermined target frame relay interval.

* * * * *